(12) United States Patent
Nagashima

(10) Patent No.: US 7,072,741 B2
(45) Date of Patent: Jul. 4, 2006

(54) ROBOT CONTROL ALGORITHM CONSTRUCTING APPARATUS

(75) Inventor: Fumio Nagashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/028,311

(22) Filed: Jan. 4, 2005

(65) Prior Publication Data

US 2005/0119791 A1 Jun. 2, 2005

Related U.S. Application Data

(63) Continuation of application No. PCT/JP02/10622, filed on Oct. 11, 2002.

(51) Int. Cl.
  *G06F 19/00* (2006.01)
(52) U.S. Cl. .................. 700/245; 318/568.1; 901/33; 706/17
(58) Field of Classification Search .......... 700/245, 700/246, 247, 249, 250, 251, 252, 253, 258, 700/260; 318/568.1, 568.11, 568.16, 568.17, 318/568.2, 587; 340/541, 552, 556, 587; 901/33, 47, 48; 701/23; 706/15–44
See application file for complete search history.

(56) References Cited

U.S. PATENT DOCUMENTS

| | | | |
|---|---|---|---|
| 6,243,623 B1 * | 6/2001 | Takenaka et al. | 700/245 |
| 6,289,265 B1 * | 9/2001 | Takenaka et al. | 700/245 |
| 6,480,761 B1 * | 11/2002 | Ueno et al. | 700/245 |
| 6,493,606 B1 * | 12/2002 | Saijo et al. | 700/245 |
| 6,556,892 B1 * | 4/2003 | Kuroki et al. | 700/245 |
| 6,697,709 B1 * | 2/2004 | Kuroki et al. | 700/245 |
| 6,832,131 B1 * | 12/2004 | Hattori et al. | 700/245 |
| 6,876,903 B1 * | 4/2005 | Takenaka | 700/245 |
| 6,920,374 B1 * | 7/2005 | Takenaka et al. | 700/245 |
| 6,922,609 B1 * | 7/2005 | Takenaka et al. | 700/245 |
| 6,969,965 B1 * | 11/2005 | Takenaka et al. | 318/568.12 |
| 2005/0197982 A1 * | 9/2005 | Saidi et al. | 706/21 |

OTHER PUBLICATIONS

J-Q Huang, G.L. Lewis, K. Liu, A Neural Net Predictive Control for Telerobots with Time Delay, Journal of Intelligent and Robotic Systems, 2000, vol. 29, No. 1, pp. 1-25.
Aude Billard, Gillian Hayes, DRAMA, a Connectionist Architecture for Control and Learning in Autonomous Robots, Adaptive Behavior, 1999, vol. 7, No. 1, pp. 35-63.

(Continued)

*Primary Examiner*—Thomas G. Black
*Assistant Examiner*—McDieunel Marc
(74) *Attorney, Agent, or Firm*—Staas & Halsey LLP

(57) ABSTRACT

A control algorithm constructing device that constructs a control algorithm controlling the motion of a robot, and a controller that controls the motion of the robot in accordance with the constructed control algorithm, with the purpose of reducing the cost and time taken to create the control algorithm as compared with the conventional method such as an MZP method to solve a mechanical equation, in which the control algorithm is constructed by a recurrent neural network (RNN) including a neuron generating an output with an analogue lag with respect to an input, the coefficients of the RNN are determined in succession from the term of lower degree to the term of higher degree.

18 Claims, 43 Drawing Sheets

OTHER PUBLICATIONS

Jian Shan, Fumio Nagashima: Biologically Inspired Spinal Locomotion Controller for Humanoid Robot, Proceedings of the 19th Annual Conference of the Robotics Society of Japan, 2001, pp. 517-518.

G. Taga, Y. Miyake, Y. Yamaguchi and H. Shimizu: Generation and Coordination of Bipedal Locomotion through Global Entrainment, IEEE Proceedings of ISADS, Mar. 30, 1993, Kawasaki, Japan pp. 199-205.

* cited by examiner

Neuron with time lag

Neuron with plural inputs

Change of weight on connection with neuron (A)

(B)

Example of trigonometric function generator No.1

Example of trigonometric function generator No.2

ROBOT CONTROL ALGORITHM CONSTRUCTING APPARATUS

This application is a continuing application, filed under 35 U.S.C. §111(a), of International Application PCT/JP02/10622, filed Oct. 11, 2002.

TECHNICAL FIELD

The present invention relates to a robot control algorithm constructing apparatus that constructs a control algorithm for controlling the operation of a robot, a robot control algorithm constructing program storage medium storing a robot control algorithm constructing program that enables an information processing apparatus such as a computer to operate as the robot control algorithm constructing apparatus, a robot controller that controls the operation of the robot, a robot control program storage medium storing a robot control program that enables an information processing apparatus such as computer to operate as the robot controller, and the robot.

BACKGROUND ART

In recent years, a robot of human coexistent type has been vigorously researched (e.g., refer to the non-patent documents 1 and 2). In the near future, a robot will go into the town and work to help the man in a scene. Also, those robots will perform exactly different works.

Herein, a biped robot developed recently operates in accordance with a control algorithm called a ZMP method (Zoro Momentum Point method).

FIG. 1 is a principle view for explaining the ZMP method.

When the robot is stationary, the upper part of body is raised to have the center of gravity of the robot directly above the sole of foot to keep the attitude standing.

On the contrary, when the robot attempts to advance, the robot falls backward in a state where the center of gravity is directly above the sole of foot.

This is because the ZMP (dynamic center of gravity) is situated backward. To prevent the robot from falling down, when advancing, the upper part of body is inclined forward and accelerated, causing a restoring force to be exerted, and in view of a reaction force from the floor and the center of gravity of the robot, the upper part of body is adjusted at a degree of inclination to locate the ZMP at the target point. In this way, the biped robot can move forward by controlling the ZPM (dynamic center of gravity) to be always at the target point.

A control algorithm based on this MZP method needs very complex mechanical, mathematical arithmetic operations, and takes a lot of cost and time for development. Also, employing the ZMP method, the robot walks in a completed manner of a so-called Noh player, and has a way of walking to make an impression slightly different from "humanoid".

Also, most of the robots, not limited to the biped robot employing the ZMP method, at present, have software performing a specific operation and written in a procedural language. Therefore, it is required to replace this software to perform an exactly different operation. In effect, it is required to restructure the control algorithm. If the algorithm necessary for work is made for each work, a number of pieces of software are needed, greatly increasing the cost. One method is to develop the middleware to reduce the cost, and another method is to cause the robot or the robot controller to learn by itself and memorize each work.

As a typical example of this self-learning system, a neural network is well known.

FIG. 2 is a diagram showing a Layered Neural Network (LNN) model.

Herein, a neuron is arranged on each of an input layer, an intermediate layer and an output layer. All the inputs into the LNN are accepted by the neurons on the input layer, the output from each neuron on the input layer is passed to each neuron on the intermediate layer, the output from each neuron on the intermediate layer is passed to the neuron on the output layer, and the output from the neuron on the output layer is outputted from the LNN.

FIG. 3 is a diagram showing a model of each neuron making up the LNN as shown in FIG. 2. FIG. 4 is a diagram showing a sigmoid function defining the relationship between the input and output of the neuron. As shown in FIG. 3, when there are plural inputs $X_1, X_2, X_3, \ldots, X_i$ from the former stage, this neuron accepts $$X = \sum_i X_i W_i \tag{1}$$

as a total input, where each coupling strength is $W_1, W_2, W_3, \ldots, W_i$, and in this neuron, the output $Y=f(X)$ is produced in accordance with the sigmoid function of FIG. 4, $$f(X) = \frac{1}{1 + \exp(-X)} \tag{2}$$

Regarding this LNN, it is required that the value of each coefficient called the coupling strength $W_1, W_2, W_3, \ldots, W_i$ is determined. As a method for determining those coefficients, a BP (Back Propagation) method is well known, in which various learning methods such as learning with teacher and learning without teacher are provided.

This LNN basically processes the input through the filter to provide the output. Though the coefficients (coupling coefficients $W_1, W_2, W_3, \ldots, W_i$) of the filter are appropriately determined by the BP method, the LNN can not produce the output corresponding to a periodic motion or aperiodic motion, and is essentially inappropriate for controlling the operation of the robot.

As another model of the neural network, a Recurrent Neural Network (RNN) is well known.

FIG. 5 is a diagram showing a RNN model.

Though in the LNN of FIG. 2 the signal orderly flows from the input side to the output side, in the RNN of FIG. 5 the signal is passed from the neuron on the input side to the neuron on the output side, and vice versa, whereby there is a loop of signal flow.

This RNN is vigorously researched, but no decisive method has been yet found as the combinatorial method of neurons (determining the signal propagation route) or learning method (determining the coefficient values).

(Non-Patent Document 1)

Jiang Shan, Fumio Nagashima: Biologically Inspired Spinal Locomotion Controller for Humanoid Robot, The 19-th Japan Robot institute science lecture meeting, p. 517–518 (2001)

(Non-Patent Document 2)

Taga G., Miyake Y., Yamaguchi Y., Shimizu H.: Generation and Coordination of Bipedal Locomotion through Global Entrainment (1991)

DISCLOSURE OF THE INVENTION

This invention has been achieved in the light of the above-mentioned problems, and it is an object of the invention to provide a robot control algorithm constructing apparatus, and a robot control algorithm constructing program storage medium that stores a robot control algorithm constructing program in which the cost and time taken to create a control algorithm are greatly reduced as compared with the conventional method such as MZP method solving the dynamic equation, and a robot controller, a robot control program storage medium that stores a robot control program and a robot with low cost.

In order to achieve above object, the present invention provides a robot control algorithm constructing apparatus that constructs a control algorithm controlling the operation of a robot having at least one joint connecting two members to make the relative position or attitude between the two members variable, including, a definition storage section that stores a definition of a neuron to produce an output with an analogue lag including a zero lag based on an input, a control algorithm generation section that generates a control algorithm with the coefficient values undetermined, constructed by a recurrent neural network having plural neurons and including at least one lag neuron to produce an output with an analogue lag excluding a zero lag in the plural neurons, in which there is a loop of signal flow, employing the definition stored in the definition storage section, and a coefficient value determination section that determines the coefficient value for the control algorithm generated by the control algorithm generation section.

Herein, the "robot" is needed to "have at least one joint connecting two members to make the relative position or attitude between the two members variable", in which a manipulator conforming to this definition corresponds to the robot as referred to here.

Also, the "analogue lag" means the lag with a phenomenon in which the output value is smoothly changed with lag for a change in the input value.

The robot control algorithm constructing apparatus of the invention constructs the control algorithm adopting the recurrent neural network having a signal loop, as described with reference to FIG. 5. In the neurons making up this recurrent neural network, a lag neuron to produce the output with analogue lag in the definition based on the input is included, whereby a trigonometric function having various periods is implemented to generate a periodic signal of any waveform, or a polynomial is implemented to generate an aperiodic signal of various waveforms. The recurrent neural network conforming to the control purposes is constructed employing the neurons as defined in the above way, whereby the control algorithm can be constructed to make equivalent control more easily than the conventional control algorithm involving an enormous amount of mechanical arithmetical operations, such as the ZMP method.

Herein, the control algorithm generation section may determine the control algorithm in accordance with an operation of the operator, or automatically generate the control algorithm in accordance with a predetermined generation algorithm generating the control algorithm, for example, automatically generate the partial network corresponding to higher degree successively, as will be described later in the embodiment.

Also, the coefficient value determination section may determine the coefficient values in accordance with an operation of the operator, or based on the evaluation function evaluating the operation of the robot of control object, or in a combination thereof.

Also, the definition storage section preferably stores a definition of neuron in which the output $V_1$ is basically produced in accordance with an expression $$\varepsilon_1 \frac{dV_1}{dt} + V_1 = V_0 \tag{3}$$

where the input is $V_0$, the output is $V_1$ and the lag is $\varepsilon_1$.

The "analogue lag" in the above definition is represented in the simplest numerical formula (3). Since there is no need for employing a more complex expression than the formula (3) in representing the "analogue lag" in the above definition, it is preferable to employ the formula (3) as the definition of neuron to produce the output with "analogue lag".

The neuron here is basically represented in the formula (3), but some variations are preferably included.

That is, it is preferable that the definitions stored in the definition storage section include a definition of neuron of accepting plural inputs and producing an output with an analogue lag including a zero lag, based on a sum of the plural inputs, and the control algorithm generation section freely generates a control algorithm including the neuron in accordance with the definition.

Also, it is preferable that the definitions stored in the definition storage section include a definition of neuron of weighting the input and producing the output with an analogue lag including a zero lag, based on the weighted input, and the control algorithm generation section freely generates a control algorithm including the neuron in accordance with the definition.

It is more preferable that when the definitions stored in the definition storage section include a definition of neuron weighting the input, the definitions stored in the definition storage section include a definition of changing the weight in accordance with the output of another neuron, and the control algorithm generation section freely generates a control algorithm including the neuron weighting the input and another neuron changing the weight.

Also, it is preferable that the definitions stored in the definition storage section include a definition of changing a lag of the neuron in accordance with the output of another neuron, and the control algorithm generation section freely generates a control algorithm including the another neuron and the neuron producing the output with the lag that is changed in accordance with the output of the another neuron.

Also, it is preferable that the definitions stored in the definition storage section include a definition of neuron adopting a threshold instead of the input when the input exceeds the threshold, and the control algorithm generation section freely generates a control algorithm including the neuron in accordance with the definition.

Herein, "when the input exceeds the threshold", there are plural modes. That is, there are a mode of using the threshold as the upper limit value in which when the input is smaller than the threshold, the input is validated, or when the input exceeds the threshold, the threshold is validated, and conversely, a mode of using the threshold as the lower limit value in which when the input is larger than the threshold, the input is validated, or when the input is below the threshold, the threshold is validated. Herein, it is preferable that the neurons in both modes are defined.

Moreover, it is preferable that the definitions stored in the definition storage section include a definition of a switch turning on or off the connection between two neurons in accordance with the output of another neuron, and the control algorithm generation section freely generates a control algorithm including the another neuron and the two neurons defining the connection being turned on or off by the switch in accordance with the output of the another neuron.

Also, in the robot control algorithm constructing apparatus of the invention, it is preferable that the control algorithm generation section freely generates a control algorithm including a partial network implementing a periodic function to output a periodic signal, in which the periodic function is a combination of plural unit periodic functions having mutually different periods, and the control algorithm generation section generates a partial network that is a combination of plural unit networks implementing the plural unit periodic functions and outputting plural unit periodic signals having mutually different periods in generating the partial network.

The coefficient value determination section preferably determines the coefficient values of the partial network by determining the coefficient value of each unit network in succession from a unit network outputting a unit periodic signal having longer period to a unit network outputting a unit periodic signal having shorter period among plural unit networks making up the partial network, when the partial network that is the combination of the plural unit networks is generated by the control algorithm generation section.

When the control algorithm for controlling a more or less complex robot is constructed, very many coefficients are included in the control algorithm, whereby it is required to determine all of the very many coefficients to complete the control algorithm. As a method for determining the coefficient values, the BP method may be employed for the LNN. However, the BP method is not applicable to the RNN (recurrent neural network) employed in this invention, because it is only applicable to the LNN.

As another method for determining the coefficient values, a dichotomy and a genetic algorithm (GA) are well known. The dichotomy basically involves substituting a value located almost centrally in a first range of coefficient values for the coefficient, evaluating whether the optimal value of the coefficient is larger or smaller than the substituted value, then substituting the value located almost centrally in a second range which is half the first range for the coefficient, in which the larger (or smaller) value from the evaluation exists in the second range, and narrowing the range by repeating this procedure to finally determine the coefficient value. On the other hand, the genetic algorithm involves variously changing the coefficient value to make evaluation, based on a heredity model of the living thing, to finally determine the appropriate value, for example, substituting a slightly different value for the coefficient to make evaluation, substituting a quite different value for coefficient to make evaluation, like mutation, or substituting an intermediate value between two values with more or less excellent evaluation to make evaluation, like a genetic inheritance to the child.

Even when the dichotomy or GA is applied, it takes a lot of time to determine the coefficients, if there are a great number of coefficients determined at the same time.

On the contrary, the number of coefficients necessary to be determined at the same time is greatly reduced by determining the coefficient values in succession from the unit network implementing the unit periodic function with longer period to the unit network implementing the unit periodic function with shorter period. Thereby, even if the process for determining the coefficient value is repeated by the number of unit networks, the time required to determine the coefficient values is shorter by an astronomical number of about $10^{57}$ times than when all the coefficient values are determined at the same time. Also, in this way, if the coefficient values are determined in succession from the unit network implementing the unit periodic function with longer period to the unit network implementing the unit periodic function with shorter period, the motion of the robot of control object is made closer to a desired smooth motion, every time the coefficients of one unit network are determined, whereby the precision of the motion of robot is sequentially enhanced to a desired precision.

Also, in the robot control algorithm constructing apparatus of the invention, it is preferable that the control algorithm generation section freely generates a control algorithm including a partial network implementing an aperiodic function represented in a polynomial and outputting an aperiodic signal, in which the control algorithm generation section generates a partial network that is a combination of plural unit networks implementing each term of the polynomial and outputting each unit signal corresponding to each term in generating the partial network.

When the partial network that is a combination of plural unit networks is generated by the control algorithm generation section, the coefficient value determination section preferably determines the coefficient values of the partial network by determining the coefficient value of each unit network in succession from a unit network outputting a unit signal corresponding to lower degree term to a unit network outputting a unit signal corresponding to higher degree term among the plural unit networks making up the partial network.

The above description regarding the periodic function (periodic motion of the robot) is also applied to the aperiodic function (aperiodic motion of the robot) represented in the polynomial. In the case of the polynomial, the coefficient values of each unit network are determined in succession from the unit network corresponding to lower degree term to the unit network corresponding to higher degree term.

Also, the present invention provides a robot control algorithm constructing program storage medium storing a robot control algorithm constructing program that is executed in an information processing apparatus performing a program and enables the information processing apparatus to operate as a robot control algorithm constructing apparatus that constructs a control algorithm controlling the operation of a robot having at least one joint connecting two members to make the relative position or attitude between the two members variable, the robot control algorithm constructing program causing the information processing apparatus to operate as the robot control algorithm constructing apparatus including, a definition storage section that stores a definition of a neuron to produce an output with an analogue lag including a zero lag based on an input, a control algorithm generation section that generates a control algorithm with the coefficient values undetermined, constructed by a recurrent neural network having plural neurons and including at least one lag neuron to produce an output with an analogue lag excluding a zero lag in the plural neurons, in which there is a loop of signal flow, employing the definition stored in the definition storage section, and a coefficient value determination section that determines the coefficient value for the control algorithm generated by the control algorithm generation section.

The robot control algorithm constructing program of the invention enables the information processing apparatus such as the computer to operate as the robot control algorithm constructing apparatus of the invention, in which the robot control algorithm constructing apparatus of the invention in various forms is operated according to the robot control algorithm constructing program of the invention to implement the various forms.

That is, in the robot control algorithm constructing program of the invention, the control algorithm generation section may determine the control algorithm in accordance with an operation of the operator, but automatically generate the control algorithm in accordance with a predetermined generation algorithm generating the control algorithm, for example, automatically generate the partial network corresponding to higher degree term successively, as will be described later in the embodiment.

Also, the coefficient value determination section may determine the coefficient values in accordance with an operation of the operator, or based on the evaluation function evaluating the operation of the robot of control object, or in a combination thereof.

Also, it is preferable that the definition storage section stores a definition of neuron in which the output $V_1$ is basically produced in accordance with an expression $$\varepsilon_1 \frac{dV_1}{dt} + V_1 = V_0 \tag{3}$$

where the input is $V_0$, the output is $V_1$ and the lag is $\varepsilon_1$. It is preferable that the definitions stored in the definition storage section include a definition of neuron of accepting plural inputs and producing an output with an analogue lag including a zero lag, based on a sum of the plural inputs, and the control algorithm generation section freely generates a control algorithm including the neuron in accordance with the definition.

Also, it is preferable that the definitions stored in the definition storage section include a definition of neuron of weighting the input and producing the output with an analogue lag including a zero lag, based on the weighted input, and the control algorithm generation section freely generates a control algorithm including the neuron in accordance with the definition.

Herein, when the definitions stored in the definition storage section include a definition of neuron weighting the input, the definitions stored in the definition storage section preferably include a definition of changing the weight in accordance with the output of another neuron, and the control algorithm generation section freely generates a control algorithm including the neuron weighting the input and another neuron changing the weight.

Also, it is preferable that the definitions stored in the definition storage section include a definition of changing a lag of the neuron in accordance with the output of another neuron, and the control algorithm generation section freely generates a control algorithm including the another neuron and the neuron producing the output with the lag that is changed in accordance with the output of the another neuron.

Also, it is preferable that the definitions stored in the definition storage section include a definition of neuron adopting a threshold instead of the input when the input exceeds the threshold, and the control algorithm generation section freely generates a control algorithm including the neuron in accordance with the definition.

Moreover, it is preferable that the definitions stored in the definition storage section include a definition of a switch turning on or off the connection between two neurons in accordance with the output of another neuron, and the control algorithm generation section freely generates a control algorithm including the another neuron and the two neurons defining the connection being turned on or off by the switch in accordance with the output of the another neuron.

Further, in the robot control algorithm constructing program of the invention, it is preferable that the control algorithm generation section freely generates a control algorithm including a partial network implementing a periodic function to output a periodic signal, in which the periodic function is a combination of plural unit periodic functions having mutually different periods, and the control algorithm generation section generates a partial network that is a combination of plural unit networks implementing the plural unit periodic functions and outputting plural unit periodic signals having mutually different periods in generating the partial network. Moreover, the coefficient value determination section preferably determines the coefficient values of the partial network by determining the coefficient value of each unit network in succession from a unit network outputting a unit periodic signal having longer period to a unit network outputting a unit periodic signal having shorter period among plural unit networks making up the partial network, when the partial network that is the combination of the plural unit networks is generated by the control algorithm generation section.

Further, in the robot control algorithm constructing program of the invention, it is preferable that the control algorithm generation section freely generates a control algorithm including a partial network implementing an aperiodic function represented in a polynomial and outputting an aperiodic signal, in which the control algorithm generation section generates a partial network that is a combination of plural unit networks implementing each term of the polynomial and outputting each unit signal corresponding to each term in generating the partial network, and the coefficient value determination section determines the coefficient values of the partial network by determining the coefficient value of each unit network in succession from a unit network outputting a unit signal corresponding to lower degree term to a unit network outputting a unit signal corresponding to higher degree term among the plural unit networks making up the partial network, when the partial network that is a combination of plural unit networks is generated by the control algorithm generation section.

Also, the present invention provides a robot controller that controls the operation of a robot having at least one joint connecting two members to make the relative position or attitude between the two members variable, including, a control algorithm storage section that generates a control algorithm constructed by a recurrent neural network having plural neurons to produce an output with an analogue lag including a zero lag based on an input and including at least one lag neuron to produce an output with an analogue lag excluding a zero lag in the plural neurons, in which there is a loop of signal flow, and a robot control section that controls the robot of control object employing a control signal generated based on the control algorithm stored in the control algorithm storage section.

The robot controller of the invention controls the robot of control object by storing the control algorithm constructed employing the robot control algorithm constructing apparatus of the invention, namely, the control algorithm constructed with the RNN having the lag neuron in the above definition, and using a control signal generated based on the stored control algorithm, whereby the robot controller is fabricated inexpensively because the control algorithm is supplied inexpensively.

Herein, in the robot controller of the invention, it is preferable that the neuron making up the recurrent neural network basically produces the output $V_1$ in accordance with an expression $$\varepsilon_1 \frac{dV_1}{dt} + V_1 = V_0 \tag{3}$$

where the input is $V_0$, the output is $V_1$ and the lag is $\varepsilon_1$.

Also, it is preferable that the recurrent neural network includes a definition of neuron of accepting plural inputs and producing an output with an analogue lag including a zero lag, based on a sum of the plural inputs, and the control algorithm storage section stores the control algorithm including the neuron in accordance with the definition.

Moreover, it is preferable that the recurrent neural network includes a definition of neuron of weighting the input and producing the output with an analogue lag including a zero lag, based on the weighted input, and the control algorithm storage section stores the control algorithm including the neuron in accordance with the definition.

Herein, when the neuron weighting the input is included, the recurrent neural network preferably includes a definition of changing the weight in accordance with the output of another neuron, and the control algorithm storage section stores a control algorithm including the neuron weighting the input and another neuron changing the weight.

Also, in the robot controller of the invention, it is preferable that the recurrent neural network includes a definition of changing a lag of the neuron in accordance with the output of another neuron, and the control algorithm storage section stores a control algorithm including the another neuron and the neuron producing the output with the lag that is changed in accordance with the output of the another neuron.

Also, it is preferable that the recurrent neural network includes a definition of neuron adopting a threshold instead of the input when the input exceeds the threshold, and the control algorithm storage section stores a control algorithm including the neuron in accordance with the definition.

Moreover, it is preferable that the recurrent neural network includes a definition of a switch turning on or off the connection between two neurons in accordance with the output of another neuron, and the control algorithm storage section stores a control algorithm including the another neuron and the two neurons defining the connection being turned on or off by the switch in accordance with the output of the another neuron.

Further, in the robot controller of the invention, it is preferable that the control algorithm storage section stores a control algorithm including a partial network implementing a periodic function to output a periodic signal, in which the periodic function is a combination of plural unit periodic functions having mutually different periods, and the control algorithm storage section may store a partial network that is a combination of plural unit networks implementing the plural unit periodic functions.

Also, in the robot controller of the invention, the control algorithm storage section may store a control algorithm including a partial network implementing an aperiodic function represented in a polynomial and outputting an aperiodic signal, in which the control algorithm storage section may store a control algorithm including a partial network that is a combination of plural unit networks implementing each term of the polynomial.

This robot controller may control the robot of control object as the algorithm implemented within a robot simulation device making the operation simulation of the robot, or control the actual robot of control object manufactured in hardware.

Also, the present invention provides a robot control program storage medium storing a robot control program that is executed in an information processing apparatus performing a program and enables the information processing apparatus to operate as a robot controller that controls the operation of a robot having at least one joint connecting two members to make the relative position or attitude between the two members variable, the robot control program causing the information processing apparatus to operate as the robot controller including, a control algorithm storage section that generates a control algorithm constructed by a recurrent neural network having plural neurons to produce an output with an analogue lag including a zero lag based on an input and including at least one lag neuron to produce an output with an analogue lag excluding a zero lag in the plural neurons, in which there is a loop of signal flow, and a robot control section that controls the robot of control object employing a control signal generated based on the control algorithm stored in the control algorithm storage section.

The robot control program of the invention enables the information processing apparatus such as the computer to operate as the robot controller of the invention, in which the robot controller of the invention in various forms is operated according to the robot control program of the invention to implement the various forms.

That is, in the robot control program of the invention, it is preferable that the neuron making up the recurrent neural network basically produces the output $V_1$ in accordance with an expression $$\varepsilon_1 \frac{dV_1}{dt} + V_1 = V_0 \tag{3}$$

where the input is $V_0$, the output is $V_1$ and the lag is $\varepsilon_1$.

Also, it is preferable that the recurrent neural network includes a definition of neuron of accepting plural inputs and producing an output with an analogue lag including a zero lag, based on a sum of the plural inputs, and the control algorithm storage section stores the control algorithm including the neuron in accordance with the definition.

Moreover, it is preferable that the recurrent neural network includes a definition of neuron of weighting the input and producing the output with an analogue lag including a zero lag, based on the weighted input, and the control algorithm storage section stores the control algorithm including the neuron in accordance with the definition.

Herein, when the neuron weighting the input is included, the recurrent neural network preferably includes a definition of changing the weight in accordance with the output of another neuron, and the control algorithm storage section stores a control algorithm including the neuron weighting the input and another neuron changing the weight.

Also, in the robot control program of the invention, it is preferable that the recurrent neural network includes a definition of changing a lag of the neuron in accordance with the output of another neuron, and the control algorithm storage section stores a control algorithm including the another neuron and the neuron producing the output with the lag that is changed in accordance with the output of the another neuron.

Also, it is preferable that the recurrent neural network includes a definition of neuron adopting a threshold instead of the input when the input exceeds the threshold, and the control algorithm storage section stores a control algorithm including the neuron in accordance with the definition.

Moreover, it is preferable that the recurrent neural network includes a definition of a switch turning on or off the connection between two neurons in accordance with the output of another neuron, and the control algorithm storage section stores a control algorithm including the another neuron and the two neurons defining the connection being turned on or off by the switch in accordance with the output of the another neuron.

Further, in the robot control program of the invention, the control algorithm storage section may store a control algorithm including a partial network implementing a periodic function to output a periodic signal, in which the periodic function is a combination of plural unit periodic functions having mutually different periods, and the control algorithm storage section stores a partial network that is a combination of plural unit networks implementing the plural unit periodic functions.

Also, in the robot control program of the invention, the control algorithm storage section may store a control algorithm including a partial network implementing an aperiodic function represented in a polynomial and outputting an aperiodic signal. In this case, the control algorithm storage section may store a control algorithm including a partial network that is a combination of plural unit networks implementing each term of the polynomial.

This robot control program may enable the information processing apparatus as the robot controller to control the robot of control object as the algorithm implemented within a robot simulation device making the operation simulation of the robot, or enable the information processing apparatus as the robot controller to control the actual robot of control object manufactured in hardware.

Moreover, the present invention provides a robot having at least one joint connecting two members to make the relative position or attitude between the two members variable, in which the robot has a robot controller that controls the operation of the robot, the robot controller including, a control algorithm storage section that stores a control algorithm constructed by a recurrent neural network having plural neurons to produce an output with an analogue lag including a zero lag based on an input and including at least one lag neuron to produce an output with an analogue lag excluding a zero lag in the plural neurons, in which there is a loop of signal flow, and a robot control section that controls the operation of the robot employing a control signal generated based on the control algorithm stored in the control algorithm storage section.

The robot of the invention has the robot controller of the invention that is incorporated into the robot to be controlled by the robot controller. The robot of the invention includes various forms of the robot controller of the invention.

That is, in the robot of the invention, it is preferable that the neuron making up the recurrent neural network basically produces the output $V_1$ in accordance with an expression $$\varepsilon_1 \frac{dV_1}{dt} + V_1 = V_0 \qquad (3)$$

where the input is $V_0$, the output is $V_1$ and the lag is $\varepsilon_1$.

Also, it is preferable that the recurrent neural network includes a definition of neuron of accepting plural inputs and producing an output with an analogue lag including a zero lag, based on a sum of the plural inputs, and the control algorithm storage section stores the control algorithm including the neuron in accordance with the definition.

Moreover, it is preferable that the recurrent neural network includes a definition of neuron of weighting the input and producing the output with an analogue lag including a zero lag, based on the weighted input, and the control algorithm storage section stores the control algorithm including the neuron in accordance with the definition.

Herein, when the neuron weighting the input is included, the recurrent neural network preferably includes a definition of changing the weight in accordance with the output of another neuron, and the control algorithm storage section stores a control algorithm including the neuron weighting the input and another neuron changing the weight.

Also, in the robot of the invention, it is preferable that the recurrent neural network includes a definition of changing a lag of the neuron in accordance with the output of another neuron, and the control algorithm storage section stores a control algorithm including the another neuron and the neuron producing the output with the lag that is changed in accordance with the output of the another neuron.

Also, it is preferable that the recurrent neural network includes a definition of neuron adopting a threshold instead of the input when the input exceeds the threshold, and the control algorithm storage section stores a control algorithm including the neuron in accordance with the definition.

Moreover, it is preferable that the recurrent neural network includes a definition of a switch turning on or off the connection between two neurons in accordance with the output of another neuron, and the control algorithm storage section stores a control algorithm including the another neuron and the two neurons defining the connection being turned on or off by the switch in accordance with the output of the another neuron.

Further, in the robot of the invention, the control algorithm storage section may store a control algorithm including a partial network implementing a periodic function to output a periodic signal, in which the periodic function is a combination of plural unit periodic functions having mutually different periods, and the control algorithm storage section stores a partial network that is a combination of plural unit networks implementing the plural unit periodic functions.

Also, in the robot of the invention, the control algorithm storage section may store a control algorithm including a partial network implementing an aperiodic function represented in a polynomial and outputting an aperiodic signal In this case, the control algorithm storage section may store a control algorithm including a partial network that is a combination of plural unit networks implementing each term of the polynomial.

BEST MODE FOR CARRYING OUT THE INVENTION

The embodiments of the present invention will be described below.

A robot control algorithm constructing apparatus and a robot controller according to an embodiment of the invention are composed of one common computer, and a robot control algorithm constructing program and a robot control program according to the embodiment of the invention, which operate within the computer.

First of all, the hardware of a computer constituting the robot control algorithm constructing apparatus and the robot controller according to the embodiment of the invention will be described below.

Figure 1:
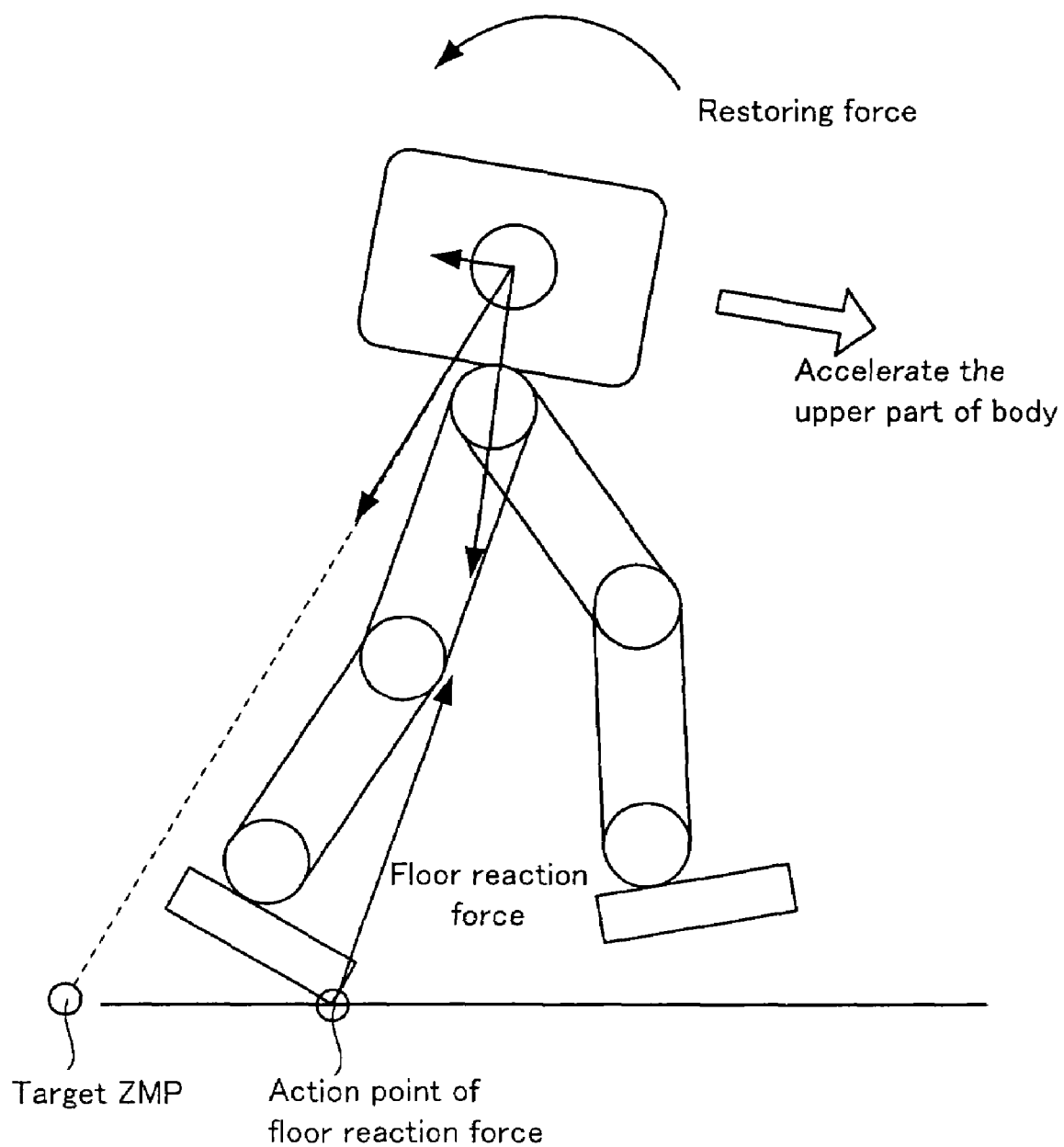
FIG. 1 is a principle view for explaining a ZMP method.
Figure 2:
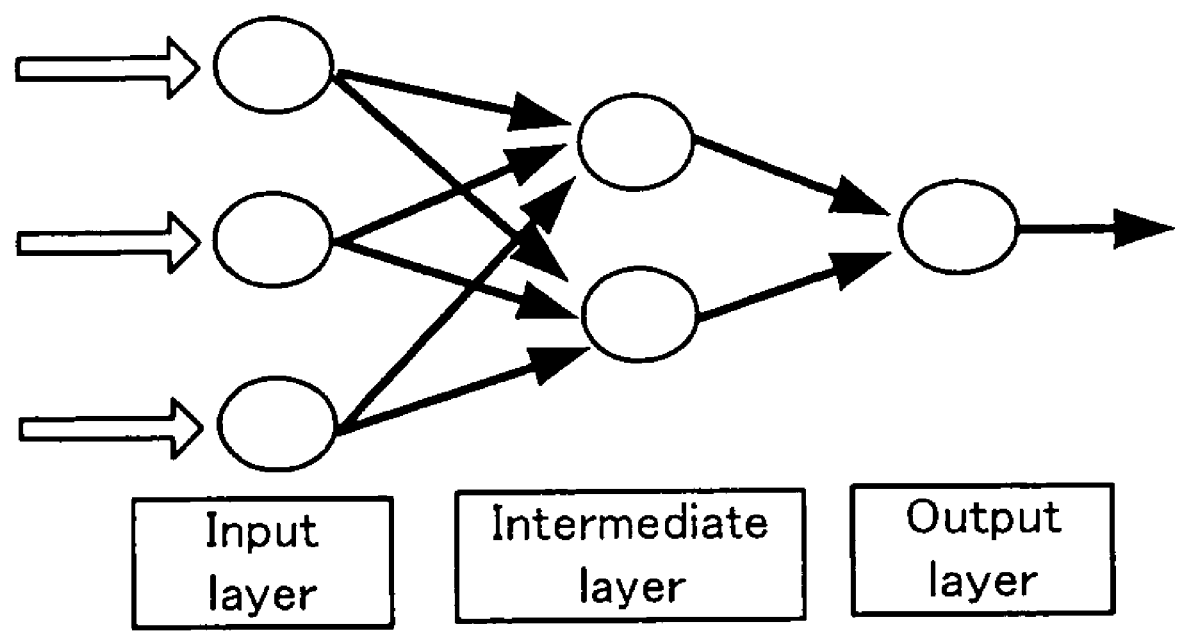
FIG. 2 is a diagram showing a Layered Neural Network (LNN) model.
Figure 3:
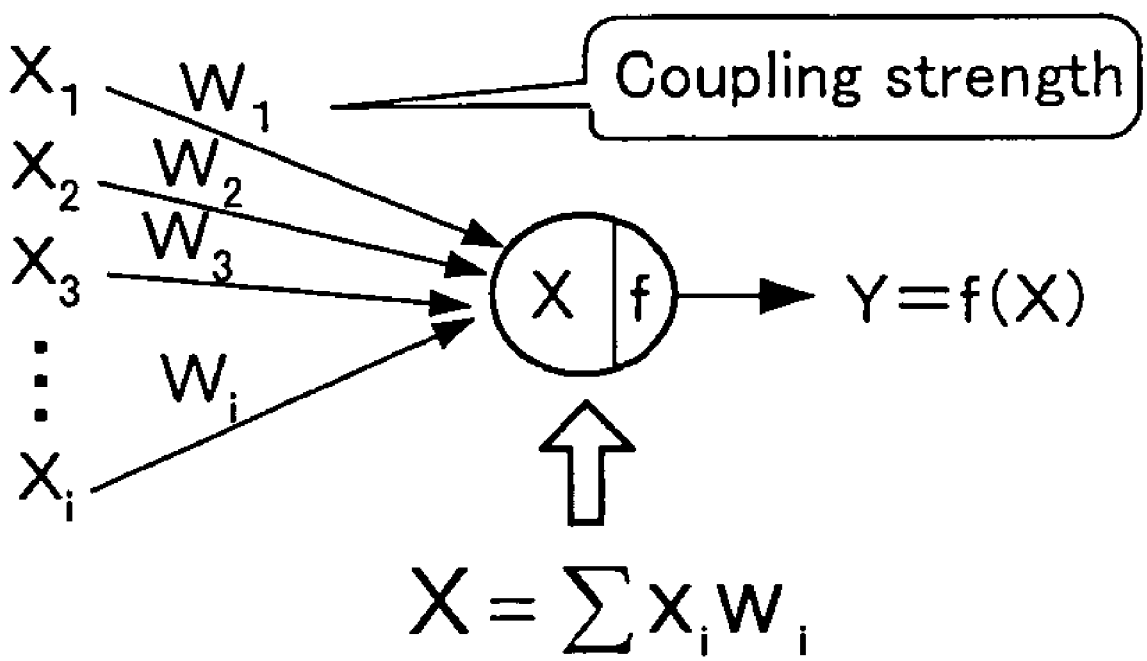
FIG. 3 is a diagram showing a model of each neuron making up the LNN as shown in FIG. 2.
Figure 4:
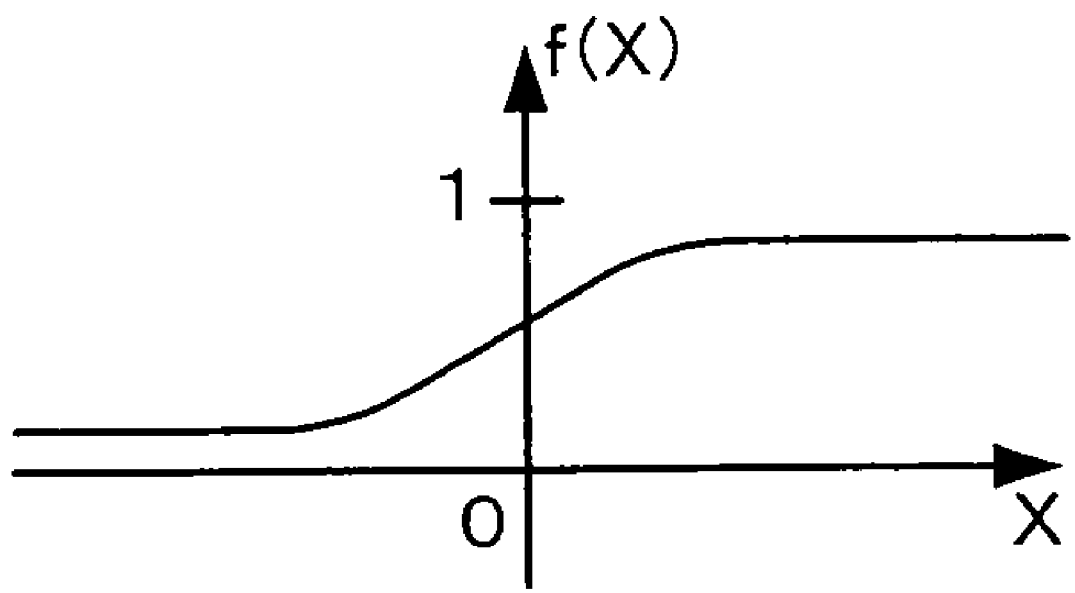
FIG. 4 is a diagram showing a sigmoid function that defines the relationship between input and output of the neuron.
Figure 5:
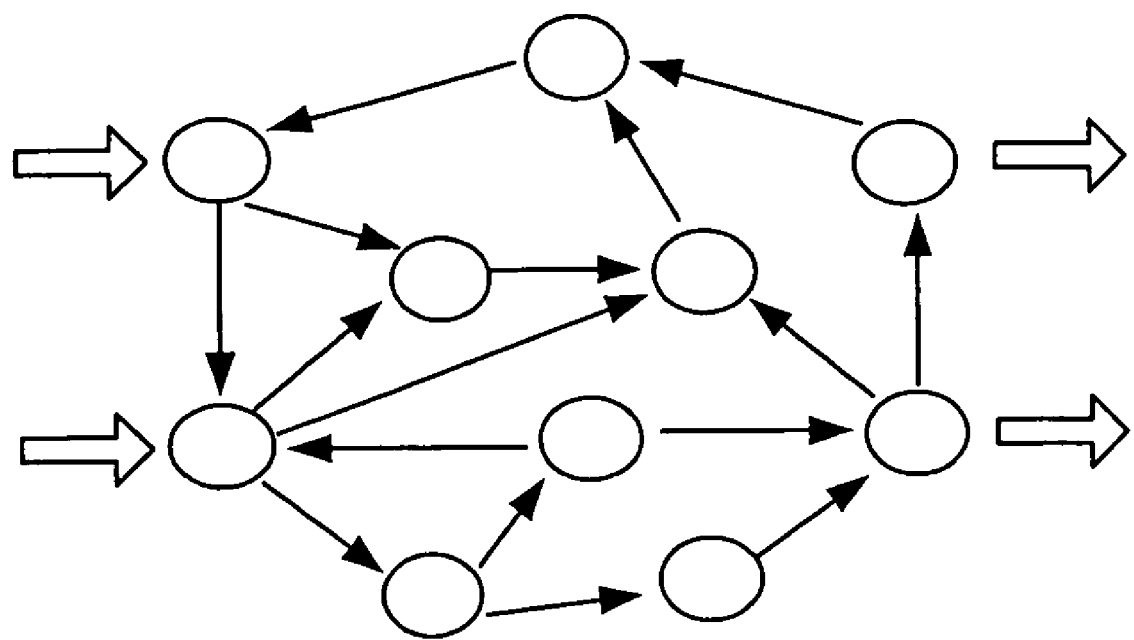
FIG. 5 is a diagram showing an RNN model.
Figure 6:
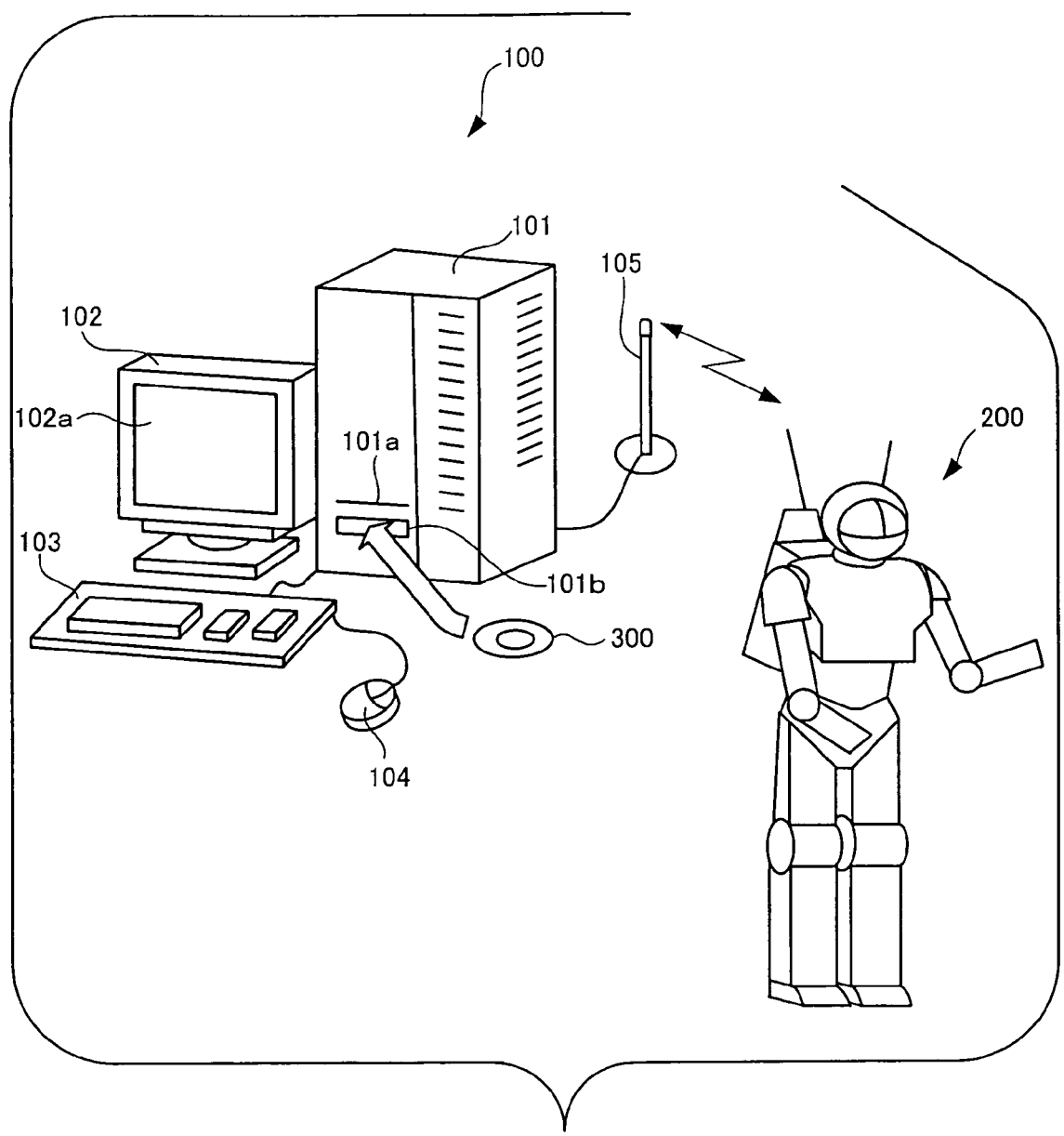
FIG. 6 is an appearance view of a computer and a robot communicating with the computer.

FIG. 6 is an appearance view of a computer and a robot communicating with the computer.

The computer includes a main section 101 containing a CPU (Central Processing Unit), a RAM (random access memory), a hard disk and a communication board, a display unit 102 that displays the image or character string on a display screen 102a upon an instruction from the main section 101, a keyboard 103 that enters a command of the operator into the computer 100, a mouse 104 that enters an instruction corresponding to an icon represented at a specified position on the display screen 102a by specifying the position, and an antenna 105 for use to make communications with the robot 200.

The main section 101 has an FD loading opening 101a into which a flexible disk (not shown) is loaded and a CD-ROM loading opening 101b into which a CD-ROM 300 is loaded, as seen from the outside, and internally includes an FD drive and a CD-ROM drive that drive and access a flexible disk (FD) and a CD-ROM 300 loaded through the loading openings 101a, 101b.

On the other hand, the robot 200 has a shape analogous to the human body, and has a joint capable of freely adjusting the angle between two members in a part corresponding to an articulation of the human body, and various kinds of sensors, including a camera in a part corresponding to a man's eye, a microphone in a part corresponding to a man's ear, and a contact sensor in a part corresponding to the man's finger. Also, this robot contains the communication equipment to communicate with the computer 100, transmitting the information from various kinds of sensors to the computer 100, or receiving a control signal from the computer 100 to perform the operation of bipedalism, based on the control signal.

This computer 100 contains a robotism constructed on an algorithm corresponding to the robot 200, in which a control algorithm controlling the operation of the robot 200 constructed using the computer 100 is employed not to directly control the operation of the robot 200, but firstly operate the robotism constructed as the algorithm within the computer 100 in accordance with the control algorithm to simulate the operation, whereby after confirming that the operation is performed as intended, the control algorithm is applied to the robot 200 as hardware.

Figure 7:
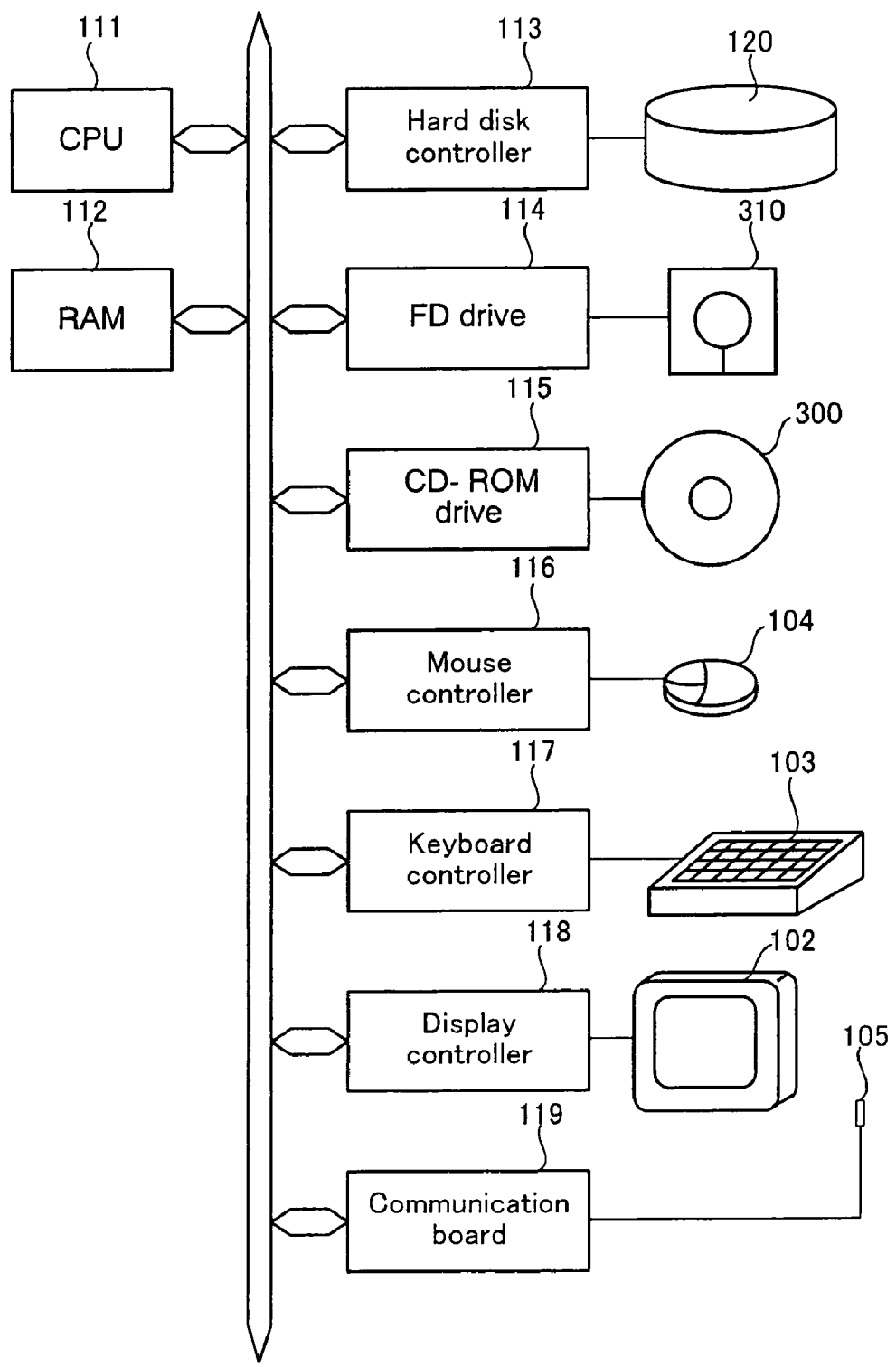
FIG. 7 is a block diagram showing the hardware configuration of the computer as shown in FIG. 1.

FIG. 7 is a hardware configuration diagram of the computer as shown in FIG. 6.

In this hardware configuration diagram, a CPU 111, a RAM 112, a hard disk controller 113, an FD drive 114, a CD-ROM drive 115, a mouse controller 116, a keyboard controller 117, a display controller 118, and a communication board 119 communicating with the robot 200 (see FIG. 6) are shown, and interconnected via a bus 110.

The FD drive 114 and the CD-ROM drive 115 gain access to an FD 310 and a CD-ROM 300 loaded from the FD loading opening 101a and the CD-ROM loading opening 101b, as described with reference to FIG. 6. The communication board 119 makes communications with the robot 200 via the antenna 105.

In FIG. 7, a hard disk 120 accessed by the hard disk controller 113, the mouse 104 controlled by the mouse controller 116, the keyboard 103 controlled by the keyboard controller 117, and the display unit 102 controlled by the display controller 118 are also shown.

Figure 8:
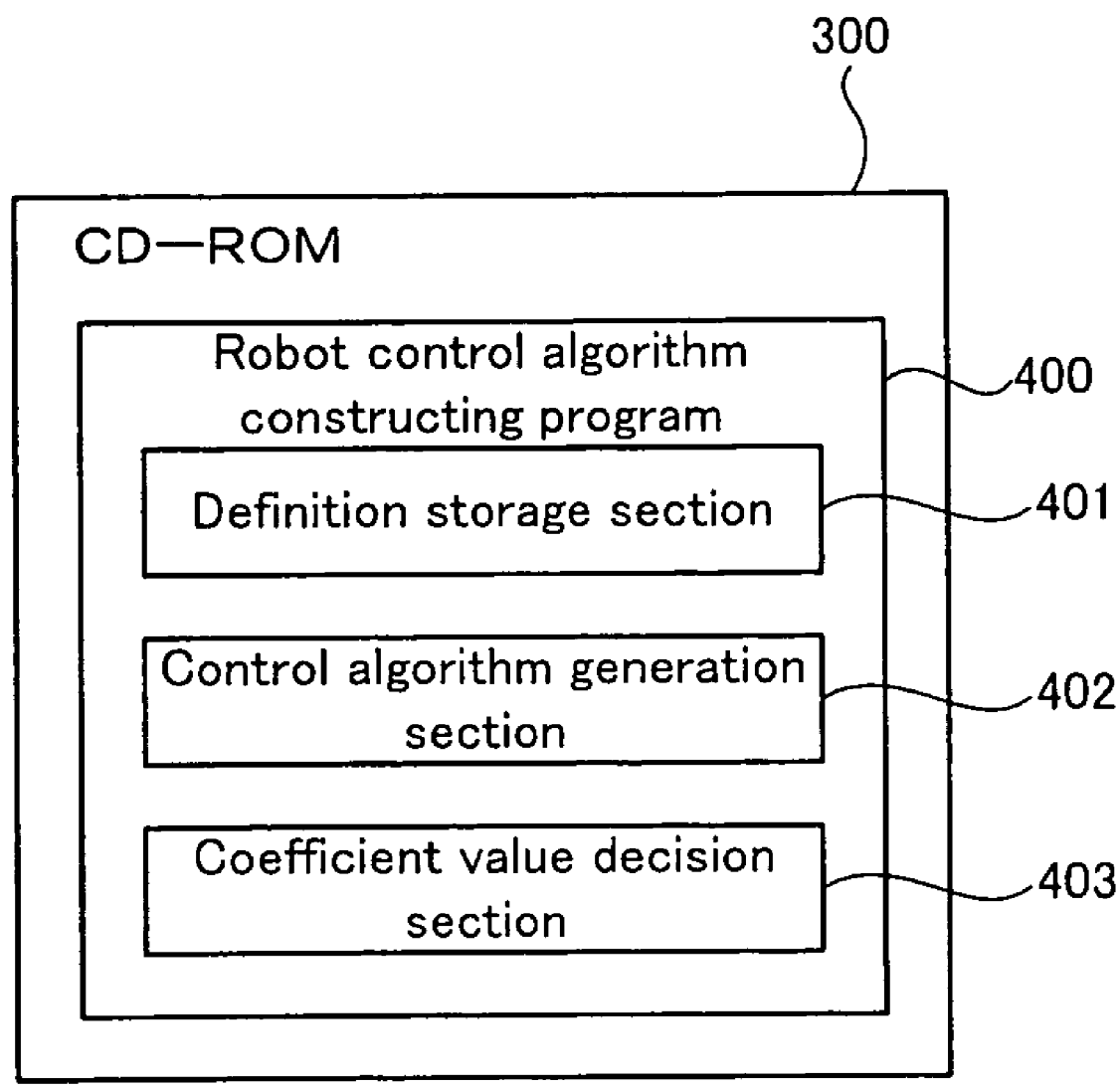
FIG. 8 is a typical diagram showing one embodiment of a robot control algorithm constructing program storage medium according to the invention.

FIG. 8 is a typical diagram showing one embodiment of the robot control algorithm constructing program storage medium according to the invention.

Herein, this robot control algorithm constructing program 400 is stored in the CD-ROM 300 that is an embodiment of the robot control algorithm constructing program storage medium according to the invention, which is loaded from the CD-ROM loading opening 101b as shown in FIG. 6, and accessed by the CD-ROM drive 115 as shown in FIG. 7, whereby the robot control algorithm constructing program 400 stored in the CD-ROM 300 is installed into the computer 100 as shown in FIGS. 6 and 7. If the robot control algorithm constructing program installed into the computer 100 is executed within the computer 100, the computer 100 operates as one embodiment of the robot control algorithm constructing apparatus according to the invention.

Though this robot control algorithm constructing program 400 is stored in the CD-ROM 300 in this example, it does not need to be stored in the CD-ROM, but may be stored in a portable storage medium such as FD and installed in the computer 100, installed from another apparatus via the communication network (not shown) into the computer 100, or prestored in the hard disk (see FIG. 7) of the computer 100. Finally, it may be saved or stored in any form so far as it is executable on the computer.

The robot control algorithm constructing program 400 as shown in FIG. 8 is composed of a definition storage section 401, a control algorithm generation section 402, and a coefficient value determination section 403. The action of each section 401 to 403 of this robot control algorithm constructing program 400 will be described below in FIGS. 8 and 9.

Figure 9:
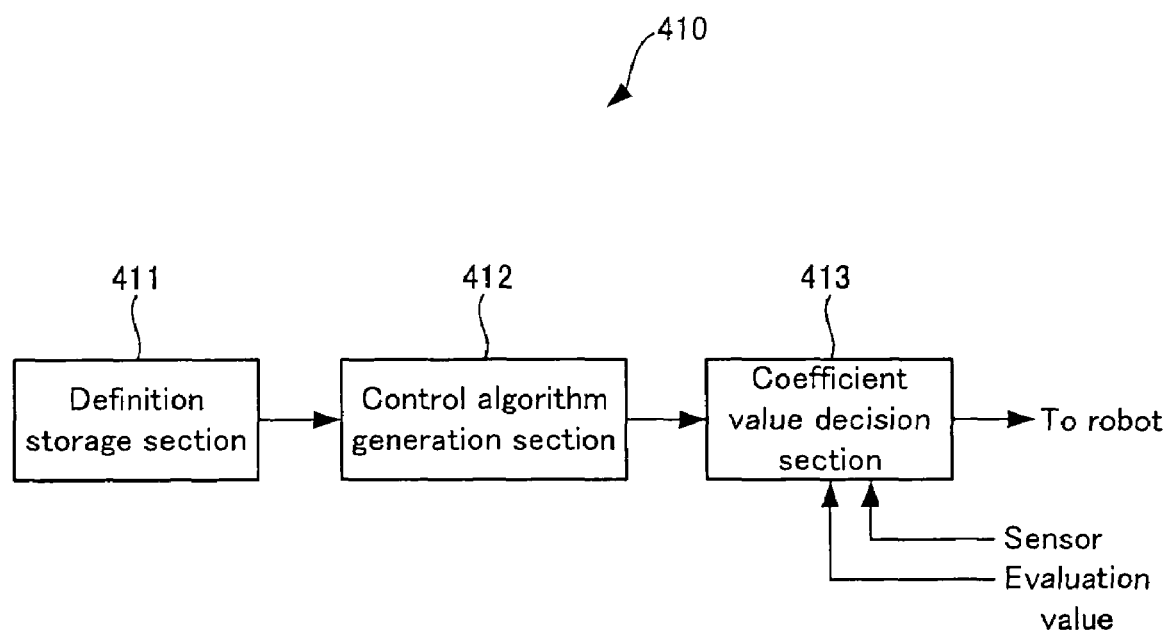
FIG. 9 is a block diagram showing one embodiment of a robot control algorithm constructing apparatus according to the invention.

FIG. 9 is a block diagram showing one embodiment of the robot control algorithm constructing apparatus according to the invention.

This robot control algorithm constructing apparatus 410 is implemented within the computer 100 as shown in FIGS. 6 and 7 by executing the robot control algorithm constructing program 400 as shown in FIG. 8 on the computer 100 as shown in FIGS. 6 and 7.

The robot control algorithm constructing apparatus 410 of FIG. 9 is composed of a definition storage section 411, a control algorithm generation section 412, and a coefficient value determination section 413. The definition storage section 411, the control algorithm generation section 412, and the coefficient value determination section 413 correspond to the definition storage section 401, the control algorithm generation section 402, and the coefficient value determination section 403 of the robot control algorithm constructing program 400 as shown in FIG. 8. Each section 411 to 413 of the robot control algorithm constructing apparatus 410 of FIG. 8 is a combination of the hardware of the computer 100 of FIGS. 6 and 7, an operating system (OS) executed within the computer 100 and each section 401 to 403 of the robot control algorithm constructing program 400 of FIG. 8 operating on the OS, while each section 401 to 403 of the robot control algorithm constructing program 400 of FIG. 8 is only composed of an application program. The action of each section 401 to 403 constituting the robot control algorithm constructing program 400 of FIG. 8 in executing this robot control algorithm constructing program 400 within the computer of FIGS. 6 and 7 is exactly the same as the action of each section 411 to 413 constituting the robot control algorithm constructing apparatus 410 of FIG. 9. In the following, only the action of each section 411 to 413 of the robot control algorithm constructing apparatus 410 of FIG. 9 will be described, because the action of each section 401 to 403 of the robot control algorithm constructing program 400 is similar.

The robot control algorithm constructing apparatus 410 of FIG. 9 constructs a control algorithm that controls the operation of the robot having at least one joint connecting two members to make the relative position or attitude between two members variable. The robot 200 as shown in FIG. 6 is of a humanoid type having the structure analogous to the human body, and has plural joints at the parts corresponding to the limbs of the man.

The definition storage section 411 constituting the robot control algorithm constructing apparatus 410 of FIG. 9 stores a definition of neuron to produce the output with an analog lag including a zero lag, based on the input. The neuron stored herein basically produces the output $V_1$ in accordance with an expression $$\varepsilon_1 \frac{dV_1}{dt} + V_1 = V_0 \qquad (3)$$

where the input is $V_0$, the output is $V_1$ and the lag is $\varepsilon_1$.

By integrating the expression (3), the expression (3) may be written as $$V_1 = C\exp\left(-\frac{1}{\varepsilon_1}t\right) + V_0 \qquad (4)$$

This neuron is composed of a program part described to satisfy the expression (3) (or expression (4) equivalent to the expression (3)). This definition storage section 411 may store the neuron as its program part and a mark indicating the neuron. Other definitions of neuron stored in the definition storage section 411 and other definitions to constitute the RNN other than the neuron will be described later.

In the control algorithm generation section 412 constituting the robot control algorithm constructing apparatus 410 of FIG. 9, a control algorithm controlling the robot 200 (see FIG. 6) in accordance with an operation on the keyboard 103 or mouse 104 for the computer 100 of FIGS. 6 and 7 by the operator, for example, is constructed employing the definition stored in the definition storage section 411. Alternatively, the control algorithm may be automatically generated in accordance with a predetermined algorithm generating the control algorithm, without waiting for an operation of the operator.

This control algorithm is constructed by a recurrent neural network (RNN) where a loop of signal flow exists, having plural neurons including a lag neuron having a finite value in which $\epsilon_1$ in the expression (3) is not zero. The control algorithm constructed in this control algorithm generation section 412 contains various coefficients (e.g., lag $\epsilon_1$ and integral constant C in the expressions (3) and (4)) as variables, in which the coefficient values are undetermined.

In the coefficient value determination section 413 constituting the robot control algorithm constructing apparatus 410 as shown FIG. 9, the coefficient values in the control algorithm generated by the control algorithm generation section 412 are determined.

This coefficient value determination section 413 may determine the coefficient values only in accordance with an operation of the operator. In this embodiment, however, the evaluation value of the robot, which is obtained by operating the robot while changing the coefficient value calculated based on an evaluation function evaluating the operation of the robot, is inputted, and the coefficient value is determined to maximize the evaluation value, as shown in FIG. 9. The evaluation function includes one or more items regarding the operation of the robot in consideration of the characteristics of the robot, such as "energy minimum", "stability of robot main body" and "high speed". The details of a coefficient determination process will be described below.

Though the definitions stored in the definition storage section 411 basically involve the neuron according to the expression (3) (or expression (4) equivalent to the expression (3)), the definitions stored in the definition storage section 411 may be transformed or derived from the neuron, or associated with the neuron. That is, the definition storage section 411 stores (a1) Basic definition of neuron according to the expression (3) (or expression (4)), (a2) Definition of neuron accepting plural inputs and producing the output with analog lag including a zero lag based on a sum of the plural inputs, (a3) Definition of neuron weighting the input and producing the output with analog lag including a zero lag based on the weighted input, (a4) Definition of changing the weight according to the output of another neuron, (a5) Definition of changing the lag of neuron according the output of another neuron, (a6) Definition of neuron adopting a threshold instead of the input, when the input exceeds the threshold, and (a7) Definition of a switch turning on or off the connection between two neurons according to the output of another neuron.

These definitions are stored in the form of program parts, as described in the definition of the expression (3) or expression (4), whereby the control algorithm generation section 412 freely uses the program parts according to the definitions (a1) to (a7) stored in the definition storage section 411 to construct the control algorithm with the RNN in combination of those program parts.

That is, the control algorithm generation section 412 generates a control algorithm with the coefficient values undetermined, which is constructed by a recurrent neural network (RNN) where a loop of signal flow exists, having plural neurons and including at least one lag neuron to produce the output with analog lag excluding a zero lag in the plural neurons, employing the definitions stored in the definition storage section 411. This control algorithm generation section 412 freely uses (b1) Basic neuron according to the expression (3) (or expression (4)), (b2) Neuron according to the definition of neuron accepting plural inputs and producing the output with analog lag including a zero lag, based on a sum of the plural inputs, (a3) Neuron according to the definition of neuron weighting the input and producing the output with analog lag including a zero lag based on the weighted input, (a4) Another neuron of changing the weight for the neuron weighting the input.

(a5) Another neuron of changing the lag of neuron producing the output with analog lag (a6) Neuron according to the definition of neuron adopting a threshold instead of the input when the input exceeds the threshold (b7) Another neuron of turning on or off a switch defining the connection between two neurons that is turned on or off by the switch whereby the control algorithm of the RNN adapted to the operation control for the robot of control object is constructed.

Moreover, the control algorithm generation section 412 generates a control algorithm including a partial network implementing a periodic function and outputting a periodic signal by connecting the neuron according to the definition stored in the definition storage section 411. When the periodic function is a combination of plural unit periodic functions having different periods, the control algorithm generation section 412 generates the partial network that is a combination of plural unit networks implementing plural unit periodic functions and outputting plural unit periodic signals having different periods in generating the partial network. And the coefficient value determination section 413 determines the coefficient values for the partial network that is a combination of plural unit networks generated by the control algorithm generation section 412 by determining the coefficient value for each unit network one by one in succession from the unit network outputting the unit periodic signal having longer period to the unit network outputting the unit periodic signal having shorter period among the plural unit networks constituting the partial network in this embodiment.

In this way, all the coefficient values are determined in a short time.

Similarly, the control algorithm generation section 412 generates a control algorithm including a partial network implementing an aperiodic function represented in a polynomial and outputting an aperiodic signal by connecting the neuron according to the definition stored in the definition storage section 411. In this case, the control algorithm generation section 412 generates the partial network that is a combination of plural unit networks implementing each term of polynomial and outputting each unit signal corresponding to each term in generating the partial network. And the coefficient value determination section 413 determines the coefficient values for the partial network that is a combination of plural unit networks generated by the control algorithm generation section 412 by determining the coefficient value for each unit network one by one in succession from the unit network outputting the unit signal corresponding to lower degree term to the unit network outputting the unit signal corresponding to higher degree term among the plural unit networks constituting the partial network in this embodiment.

The details of the coefficient value determination process will be further described later.

Herein, for the subsequent description, the notation of neuron and its connection on the drawings will be described.

Figure 10:
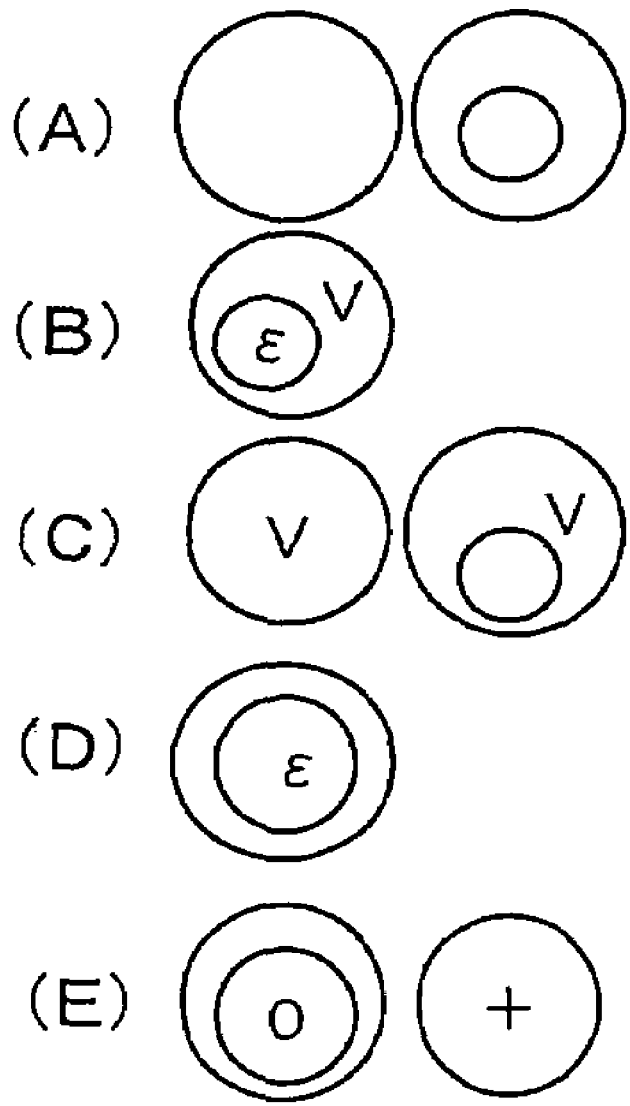
FIG. 10 is a diagram showing the notation of neuron.

FIG. 10 is a diagram showing the notation of neuron.

Parts (A) to (E) of FIG. 10 represent the neuron. In Part (A) of FIG. 10, a circle mark and a double circle mark are shown. Each mark merely indicates the existence of neuron. Though the lag and initial value may be defined for the neuron, they are not defined in the notation of Part (A) of FIG. 10.

In Part (B) of FIG. 10, the neuron is marked with V in the outer circle (outside the inner circle) of double circle, and $\epsilon$ in the inner circle, in which $\epsilon$ is the lag and V is the initial value of neuron.

In Part (C) of FIG. 10, the neuron with V in the circle and the neuron with V in the outer circle and outside the inner circle are shown, in which each neuron has the initial value V. Herein, no lag is defined.

In Part (D) of FIG. 10, the neuron is marked with $\epsilon$ in the inner circle of double circle. This neuron has the lag $\epsilon$. No initial value is defined.

In Part (E) of FIG. 10, the neuron has a zero lag as a special case of Part (D) of FIG. 10. The neuron with zero lag gives a sum of plural inputs, when there are plural inputs, and the symbol '+' indicating the sum in the circle is used, instead of the symbol of number zero in the inner circle of double circle.

Figure 11:
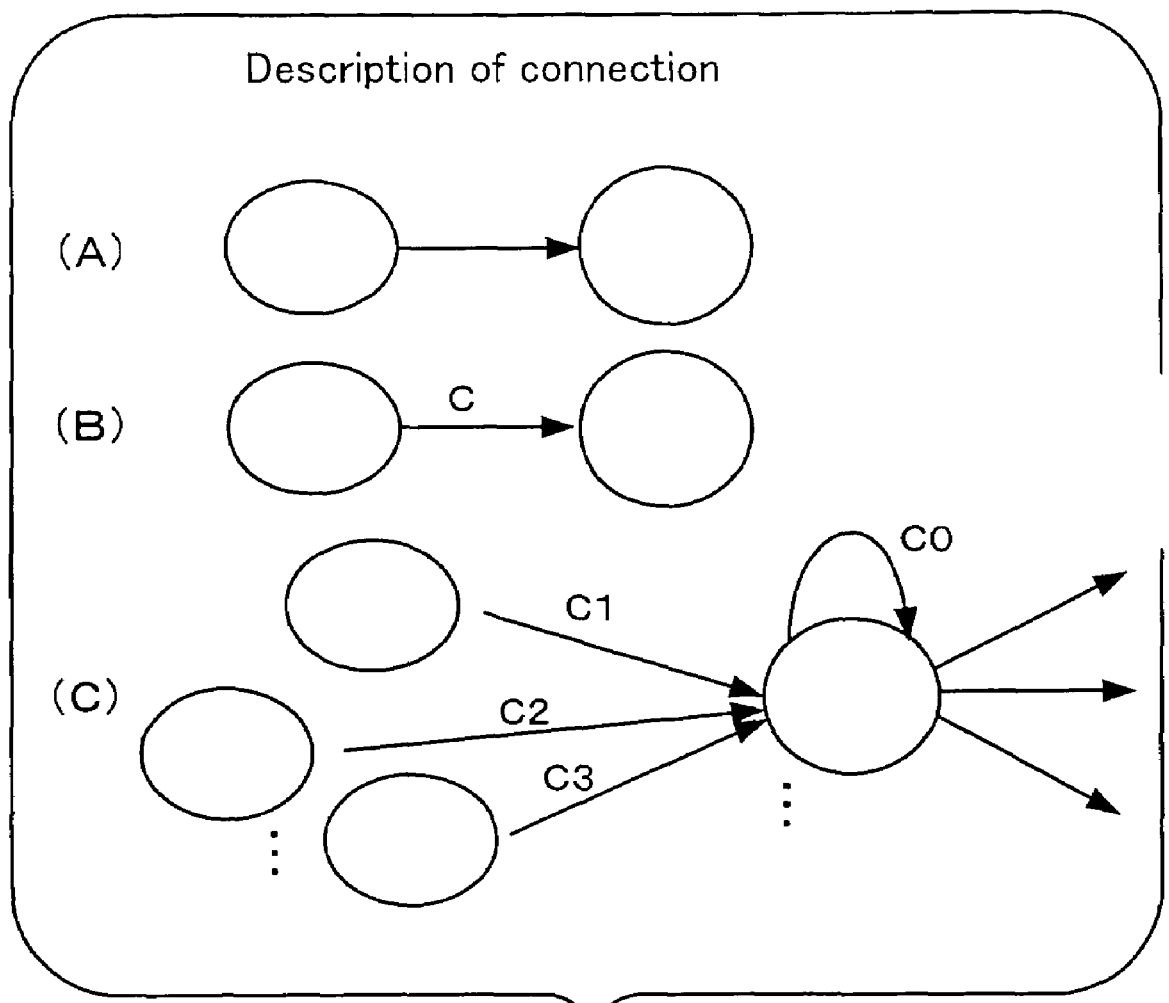
FIG. 11 is a diagram showing the notation of connection between neurons.

FIG. 11 is a diagram showing the notation of connection between neurons.

Part (A) of FIG. 11 shows a flow of signal from the left neuron to the right neuron, in which an output from the left neuron is an input into the right neuron.

Part (B) of FIG. 11 is identical to Part (A) of FIG. 11 in that an output from the left neuron is an input into the right neuron. However, in Part (B) of FIG. 11, the neuron on the right side has weight C on the input, and an arithmetical operation is performed in accordance with the expression (3) (or expression (4)), based on the weighted input.

Part (C) of FIG. 11 indicates that plural outputs from plural neurons on the left side are inputted into the neuron on the right side, weighted with weights C1, C2, C3, . . . , its own output being inputted again, weighted with weight C0, and the neuron on the right side performs an arithmetical operation in accordance with the expression (3) (or expression (4)) based on a sum of plural weighted inputs.

Then, the definition and behavior (relationship between input and output, and implemented function) of neuron will be described below, employing the notations as shown in FIGS. 10 and 11.

Figure 12:
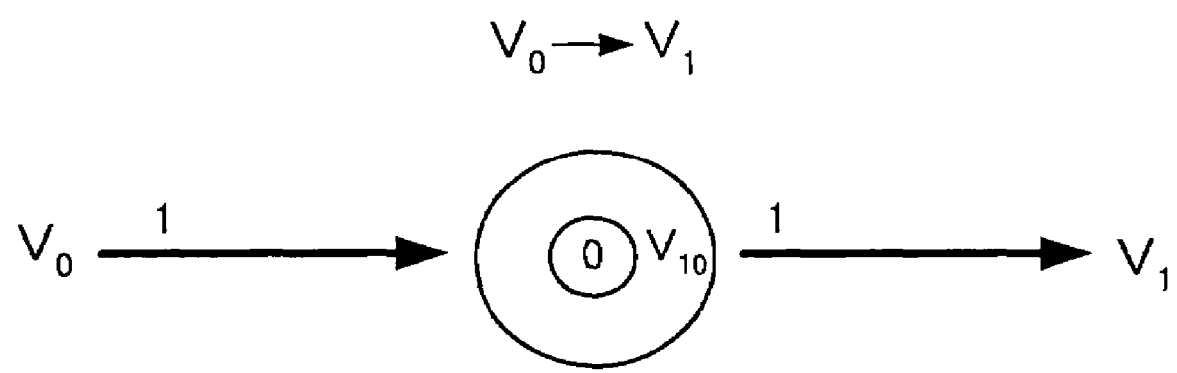
FIG. 12 is a diagram showing a neuron without time lag.
Figure 13:
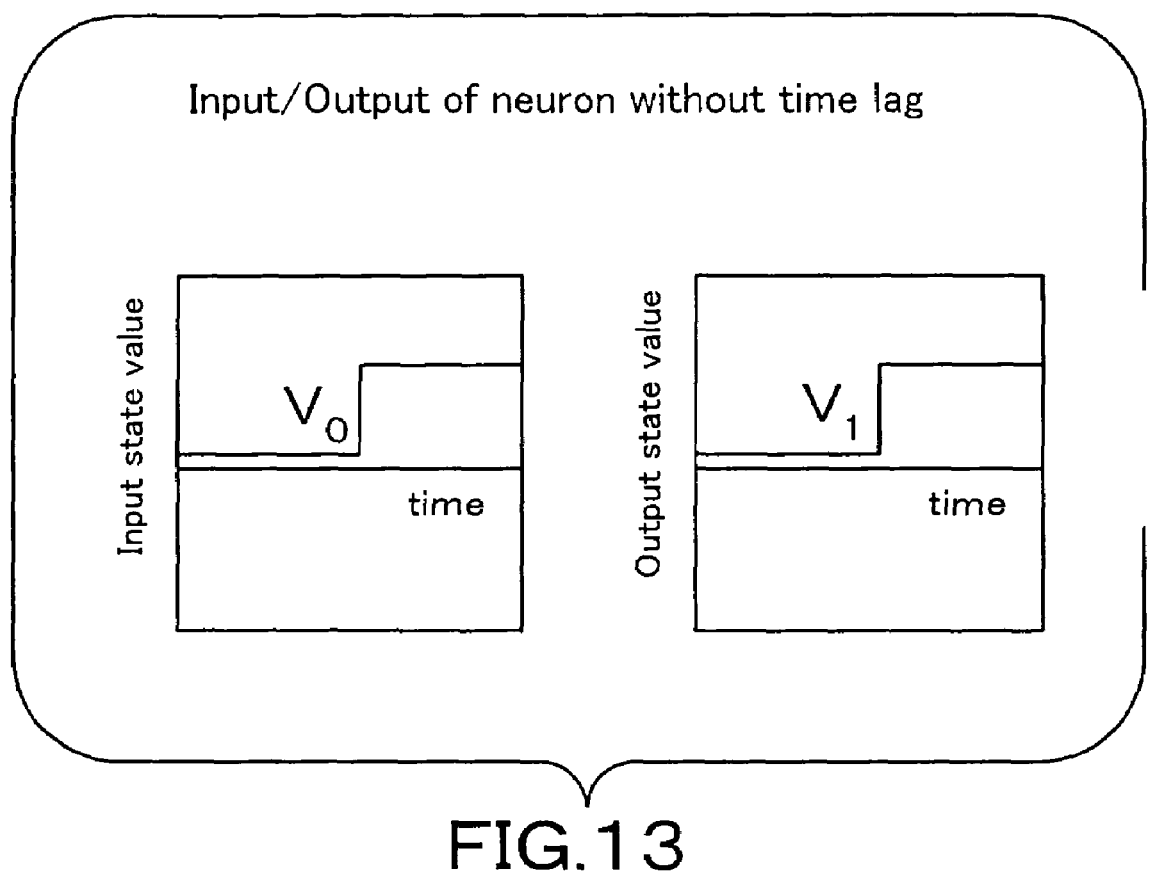
FIG. 13 is a diagram showing a temporal change in the input and output of the neuron without time lag.

FIG. 12 shows the neuron without time lag, and FIG. 13 shows a temporal change in the input and output of the neuron without time lag.

Representing the previous expression (3) again, $$\varepsilon_1 \frac{dV_1}{dt} + V_1 = V_0 \quad (3)$$

If the lag $\epsilon_1$ is zero, the expression (3) becomes $$V_1 = V_0 \quad (5)$$

That is, when the lag $\epsilon_1 = 0$, the output $V_1$ is exactly the input $V_0$, as shown in FIG. 13.

Figure 14:
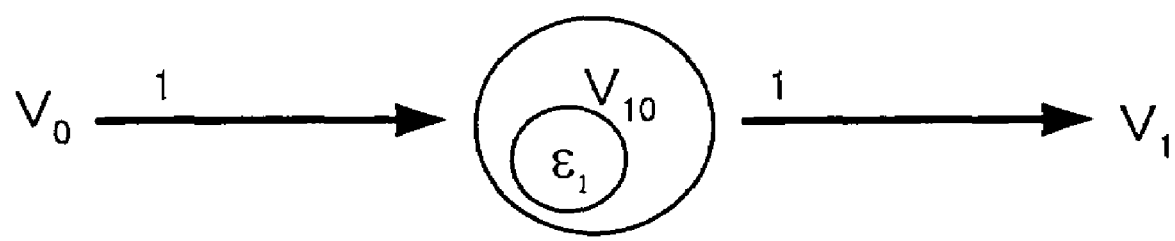
FIG. 14 is a diagram showing a neuron with a lag $\epsilon_1$ ($\epsilon_1 \neq 0$).
Figure 15:
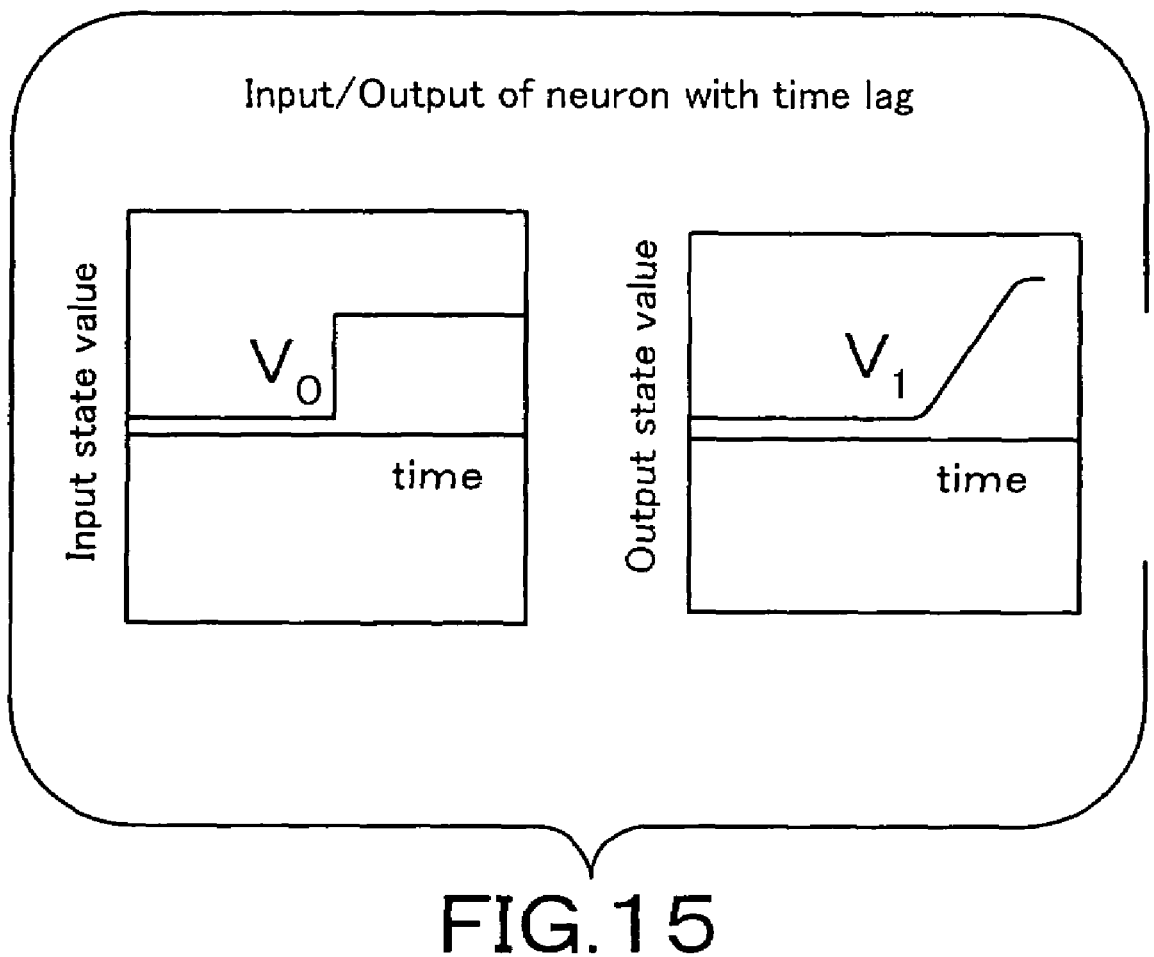
FIG. 15 is a diagram showing a temporal change in the input and output of the neuron with a lag $\epsilon_1$ ($\epsilon_1 \neq 0$).

FIG. 14 shows the neuron with lag $\epsilon_1 \neq 0$, and FIG. 15 shows a temporal change in the input and output of the neuron with lag $\epsilon_1$.

In this case, the lag $\epsilon_1$ in the expression (3) is dealt with as $\epsilon_1 \neq 0$, and the expression (3) is integrated to have the expression (4). The expression (4) is represented again here.

$$V_1 = C \exp\left(-\frac{1}{\varepsilon_1}t\right) + V_0 \quad (4)$$

Herein, the integral constant C in the expression (4) depends on the initial value $V_{10}$, and has the following relation.

$$C = V_0 - V_{10} \quad (6)$$

The first term in the expression (4) indicates that the output $V_1$ gradually changes with a time lag, as shown in FIG. 15.

Figure 16:
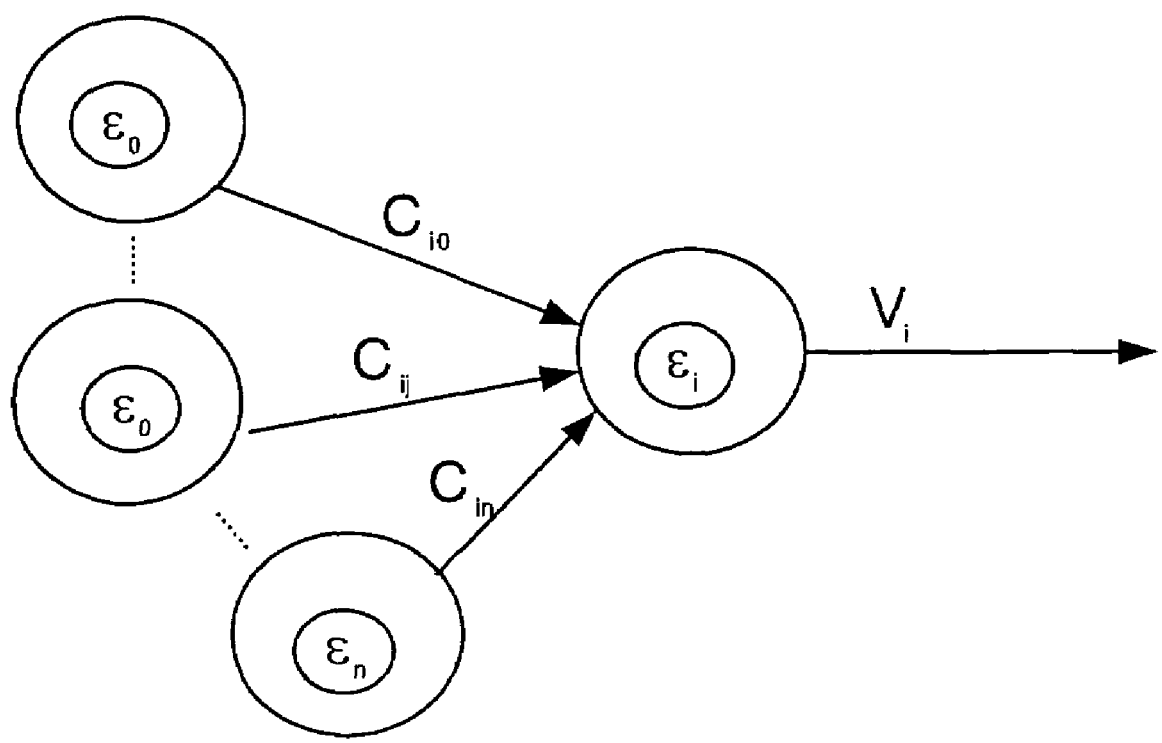
FIG. 16 is a diagram showing a neuron with plural inputs.

FIG. 16 shows the neutron of plural inputs.

In this case, each of plural inputs $V_j$ (j=0, 1, . . . , n) is weighted with each weight $C_{ij}$ (j=0, 1, . . . , n) corresponding to each input, and a sum of plural weighted inputs is dealt with as corresponding to the input $V_0$ in the expression (3). That is, the expression is represented as, employing the symbols as shown in FIG. 16, $$\varepsilon_i \frac{dV_i}{dt} + V_i = \sum_{j=0}^{n} C_{ij}V_j \quad (7)$$

Figure 17:
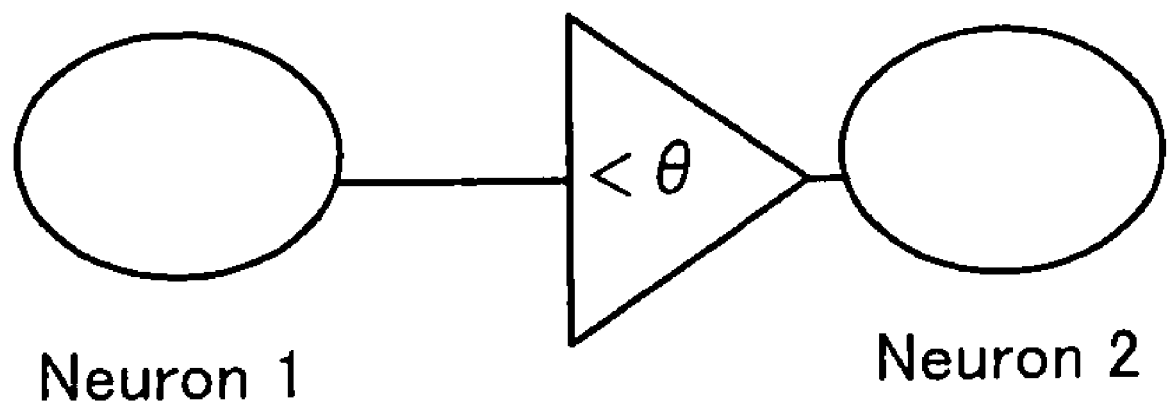
FIG. 17 is a diagram showing a neuron with upper limit threshold.

FIG. 17 shows the neuron having the upper threshold.

Herein, when the output of neuron is below the threshold $\theta$, the output of neuron 1 is directly inputted into the neuron 2, while when the output of neuron 1 is above the threshold $\theta$, the neuron 2 treats the threshold $\theta$ as the input, instead of the output of neuron 1.

In the neuron 2, threshold $\theta$ is dealt with as the input according to the output value of neuron 1, whereby the arithmetical operation is made in accordance with the expression (3) (or expression (4)).

Herein, the reason why the threshold is represented by the angle $\theta$ is that the operation of the robot is generally performed by controlling the angle of joint of the robot in most cases.

Figure 18:
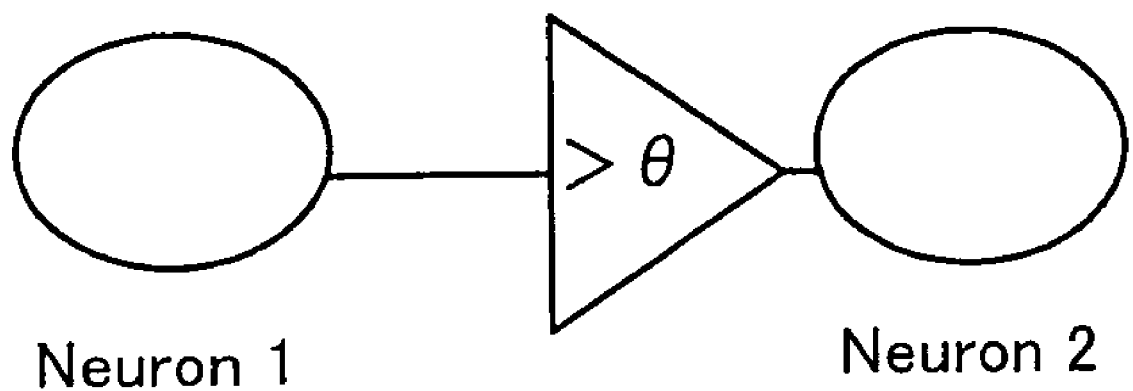
FIG. 18 is a diagram showing a neuron with lower limit threshold.

FIG. 18 shows the neuron having the lower threshold.

Herein, when the output of neuron 1 is above the threshold $\theta$, the output of neuron 1 is directly inputted into the neuron 2, while when the output of neuron 1 is below the threshold θ, the neuron 2 deals with the threshold θ as the input.

Herein, as in FIG. 17, the neuron 2 is the same as the basic neuron, except that the threshold is dealt with as the input according to the output value of neuron 1, whereby the arithmetical operation is made in accordance with the expression (3) (or expression (4)).

Figure 19:
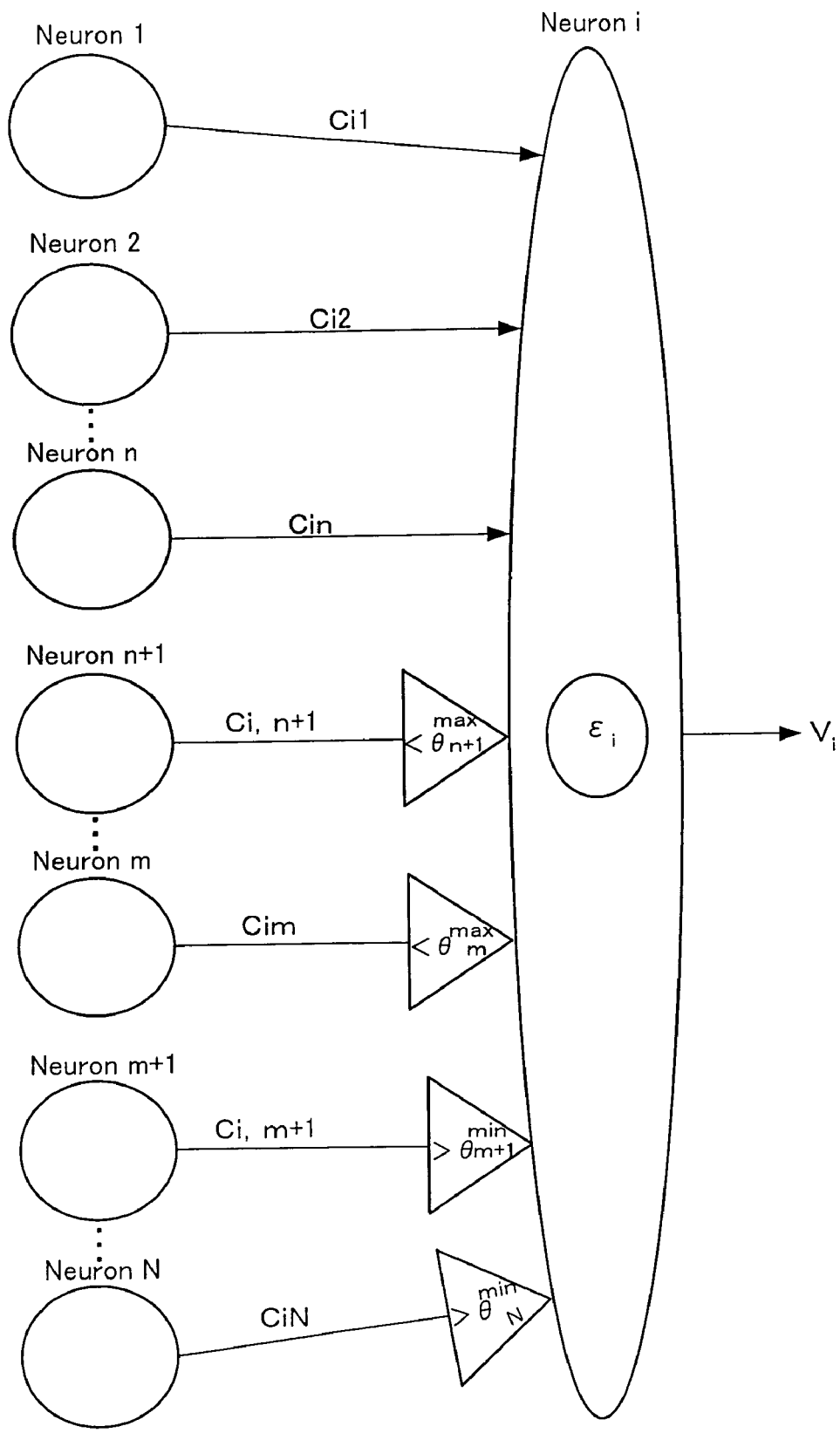
FIG. 19 is a diagram showing a typical neuron having the weighting as described with reference to FIG. 16 and the thresholds as described with reference to FIGS. 17 and 18.

FIG. 19 shows the typical neuron having weighting as described with reference to FIG. 16 and the threshold as described with reference to FIGS. 17 and 18.

The expression describing the relationship between input and output of neuron i as shown in FIG. 19 is given by $$\varepsilon_i \frac{dV_i}{dt} + V_i = \sum_{j=1}^{n} C_{ij} V_j + \sum_{j=n+1}^{m} C_{ij} \cdot \min(\theta_j^{max}, V_j) + \sum_{j=m+1}^{N} C_{ij} \cdot \max(\theta_j^{min}, V_j) \tag{8}$$

Where $V_j$ (j=1, 2, ..., n, ..., m, ..., N) is the output of neuron j, $C_{ij}$ is the weight corresponding to the connection from neuron j to neuron i, $\theta^{max}_j$ is threshold determining the maximum value, corresponding to the connection from neuron j to neuron i, $\theta^{min}_j$ is threshold determining the minimum value, corresponding to the connection from neuron j to neuron i, min(x, y) is the function taking the smaller one of x and y, and max(x, y) is the function taking the larger one of x and y.

The neuron i may be any one of the neurons 1 to N (in this case, the output of neuron i may be returned to the same neuron i, as shown in Part (C) of FIG. 11), or the neuron i may be different from the neurons 1 to N.

Figure 20:
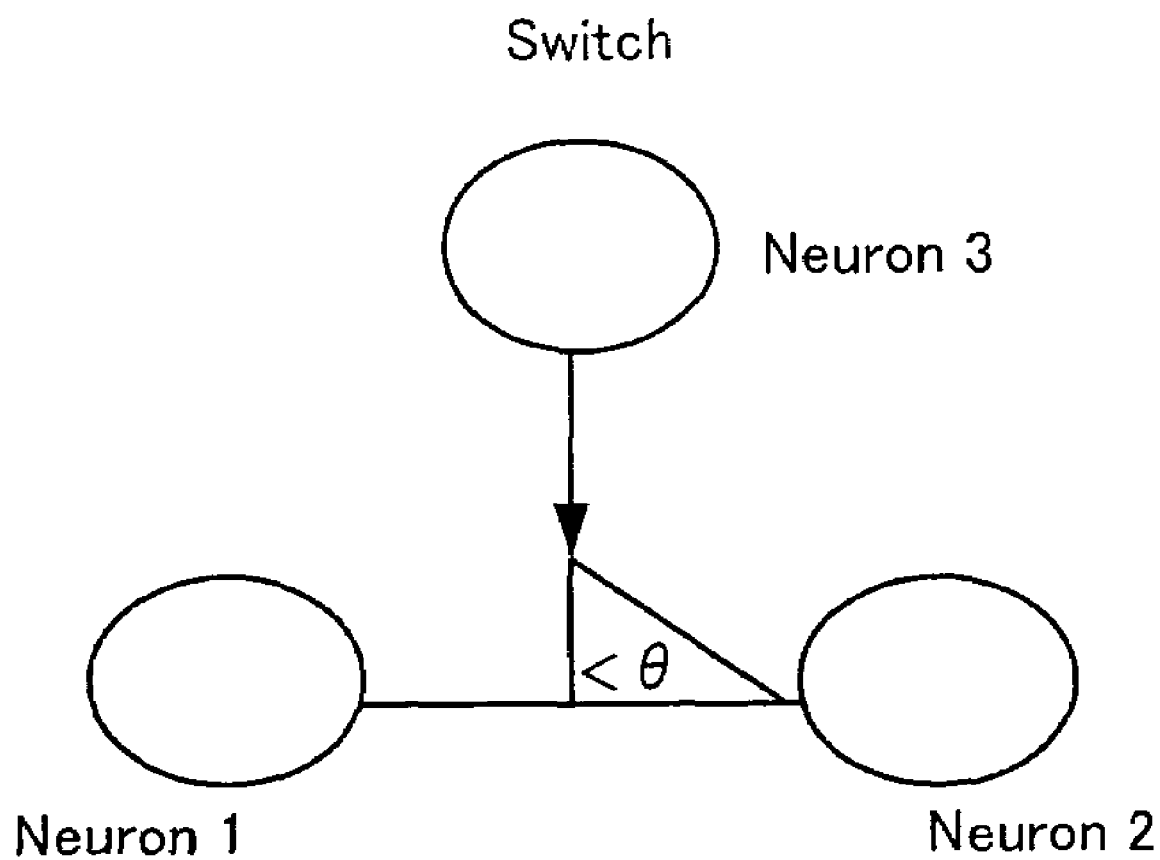
FIG. 20 is a diagram showing a switch.

FIG. 20 shows a switch.

The neuron 1and the neuron 2 are connected via the switch, which is turned on or off according to the output of another neuron 3. Herein, if the output of neuron 3 is less than the threshold θ, the switch is turned on to make the output of neuron 1 the input of neuron 2, while if the output of neuron 3 is greater than or equal to the threshold θ, the switch is turned off to cause the output of neuron 1 not to be inputted into the neuron 2. Though the symbol "<θ" is indicated in FIG. 20, this symbol may be changed to "≦θ", in which if the output of neuron 3 is equal to the threshold θ, the switch is turned on.

Also, if the symbol "<θ" in FIG. 20 is changed to ">θ", when the output of neuron 3 is beyond the threshold θ, the switch is turned on, while when the output of neuron 3 is less than or equal to the threshold θ, the switch is turned off, whereby the output of neuron 1 is not passed to the neuron 2. If the symbol ">θ" is changed to ">θ", when the output of neuron 3 is equal to the threshold θ, the switch is turned on.

Figure 21:
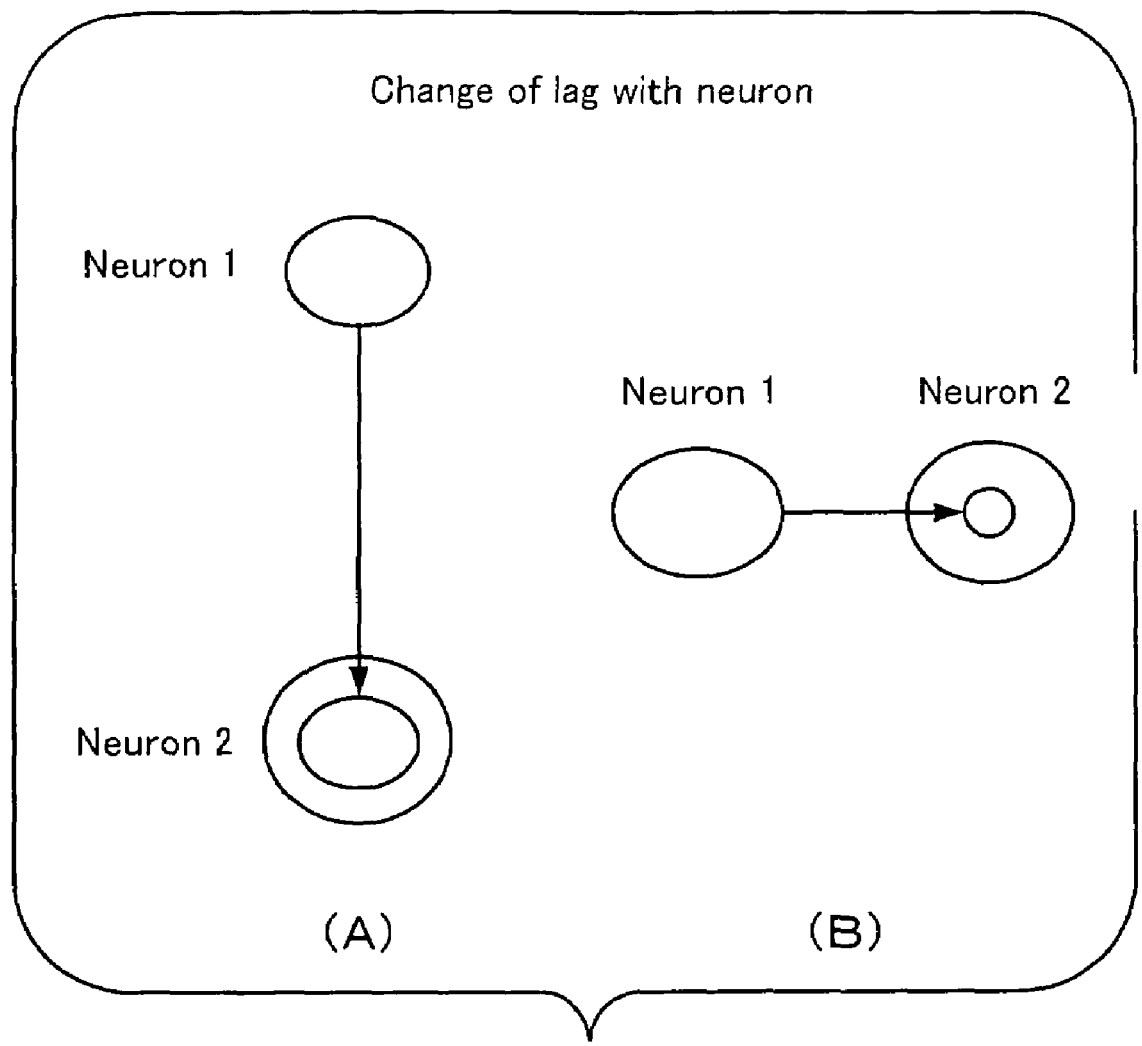
FIG. 21 is a diagram showing a change of lag with the neuron.

FIG. 21 shows a change of lag with the neuron.

Part (A) of FIG. 21 and Part (B) of FIG. 21 are depicted indifferent orientations, but equivalent. Herein, the arrow is drawn from the neuron 1 to the inner circle of double circle representing the neuron 2, which indicates that the output of neuron 1 is directly the lag ε of neuron 2 (the lag of neuron 2 is set and changed by the neuron 1). In this way, the neuron is defined to allow the lag of one neuron (neuron 2 in FIG. 21) to be changed by the output of another neuron (neuron 1 in FIG. 21).

Figure 22:
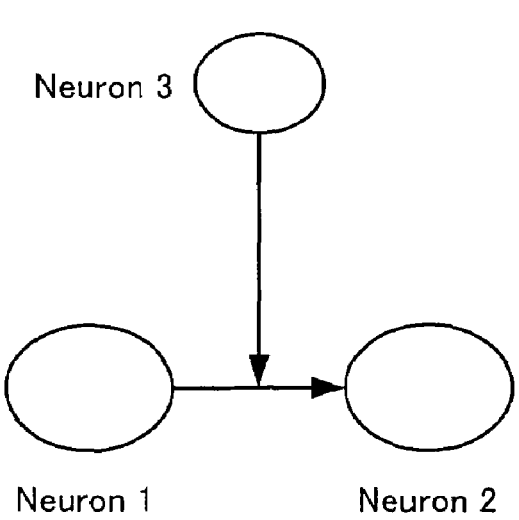
FIG. 22 is a diagram showing a change of weight on connection with the neuron.
Figure 22:
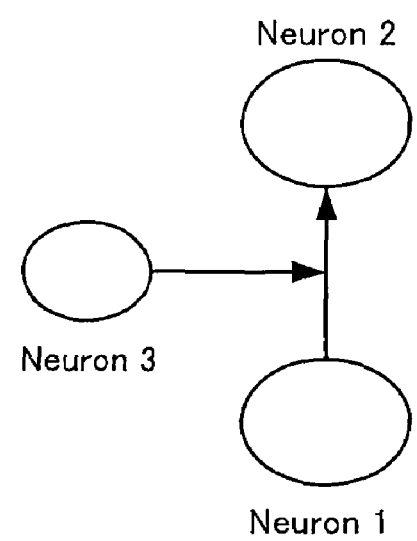

FIG. 22 shows a change of weight in the connection with the neuron.

Parts (A) and (B) of FIG. 22 are drawn in different orientations, with the same contents, as in FIG. 21. Herein, the output of neuron 1 is weighted and inputted into the neuron 2, in which the output of neuron 3 is the weight. In this way, the output of one neuron (neuron 3 here) is the weight, whereby the neuron is defined to allow the weight to be changed.

The definition storage section 411 constituting the robot control algorithm constructing apparatus 410 as shown in FIG. 9 basically stores the definitions of various neurons as described so far as the program parts describing the relationship between input and output of the neuron. The control algorithm generation section 412 generates the control algorithm with the RNN by combining the program parts. To make the generation of the control algorithm easier, the definition storage section 411 may store the definition of neuron, as described so far, and a combination of plural neurons used at high frequency as one program part, and the control algorithm generation section 412 may use the program part as the combination of plural neurons. Though the control algorithm generation section 412 may generate the control algorithm with the program language inputted to assemble the program parts stored in the definition storage section 411, the definition storage section 411 may store not only the program parts describing the relationship between input and output of the neuron, but also the symbol of notation of the neuron, as described so far, to associate the symbol of neuron with the program part representing the neuron. In this case, the control algorithm generation section 412 may generate the control algorithm in accordance with the neurons or connections displayed on the display screen 102a upon an operation of the operator to display the neuron symbol on the display screen 102a of the computer 100 and connect the neurons displayed, as shown in FIG. 6.

In the following, the function generated by combining plural neurons will be described.

Figure 23:
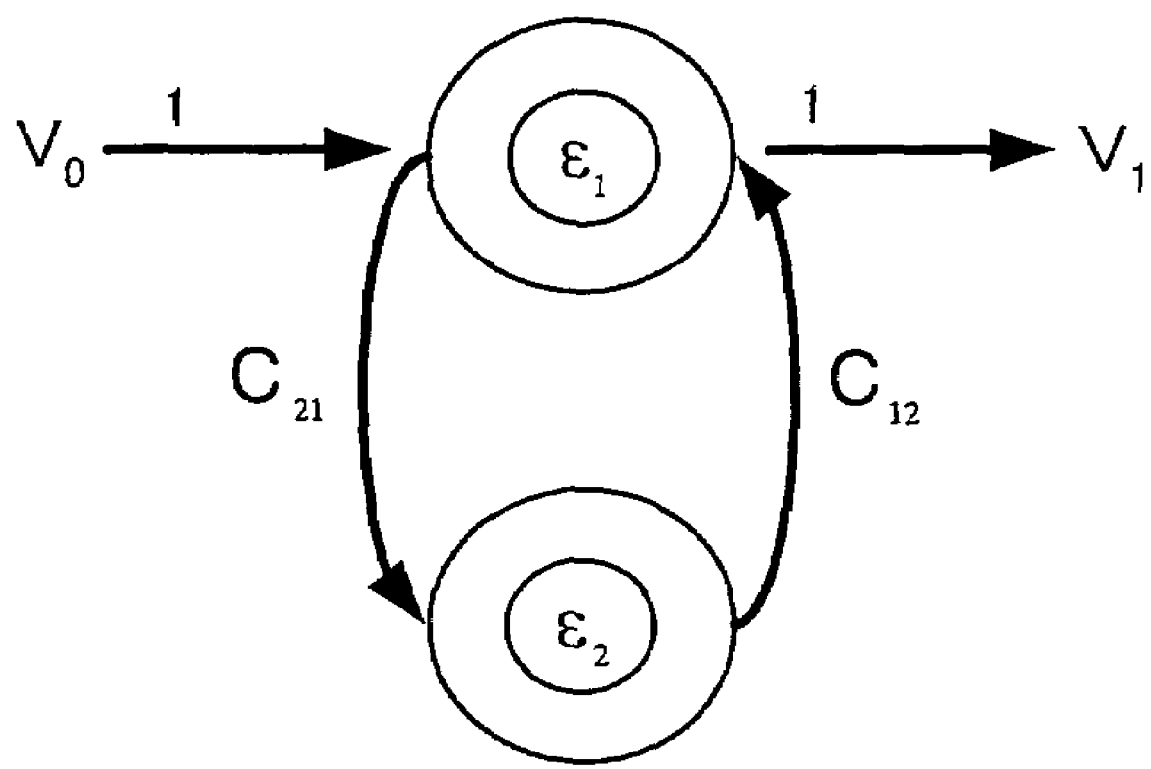
FIG. 23 is a diagram showing an example of combination of two neurons.

FIG. 23 shows an example of the combination of two neurons.

When two neurons are combined as shown in FIG. 23, the upper neuron holds the relation $$\varepsilon_1 \frac{dV_1}{dt} + V_1 = C_{12} V_2 + V_0 \tag{9}$$

and the lower neuron holds the relation $$\varepsilon_2 \frac{dV_2}{dt} + V_2 = C_{21} V_1 \tag{10}$$

Where $V_2$ denotes the output of the lower neuron.

Combining the expression (9) and the expression (10) give rise to a linear differential equation of second degree with constant coefficients $$\varepsilon_1 \varepsilon_2 \frac{d^2 V_1}{dt^2} + (\varepsilon_1 + \varepsilon_2) \frac{dV_1}{dt} + (1 - C_{12} C_{21}) V_1 = V_0 \tag{11}$$

A general solution of this linear differential equation of second degree with constant coefficients is given by $$\varepsilon_1 \varepsilon_2 \frac{d^2 V_1}{dt^2} + (\varepsilon_1 + \varepsilon_2) \frac{dV_1}{dt} + (1 - C_{12}C_{21})V_1 = \quad (12)$$

$$V_0 \varepsilon_1 \varepsilon_2 D^2 + (\varepsilon_1 + \varepsilon_2)D + (1 - C_{12}C_{21})V_1 = 0$$

$$D_1 = \frac{-(\varepsilon_1 + \varepsilon_2) + \sqrt{(\varepsilon_1 + \varepsilon_2)^2 - 4\varepsilon_1 \varepsilon_2 (1 - C_{12}C_{21})}}{2\varepsilon_1 \varepsilon_2}$$

$$D_2 = \frac{-(\varepsilon_1 + \varepsilon_2) + \sqrt{(\varepsilon_1 + \varepsilon_2)^2 - 4\varepsilon_1 \varepsilon_2 (1 - C_{12}C_{21})}}{2\varepsilon_1 \varepsilon_2}$$

$$V_1 = C_1 \exp(D_1 t) + C_2 \exp(D_2 t)$$

Figure 24:
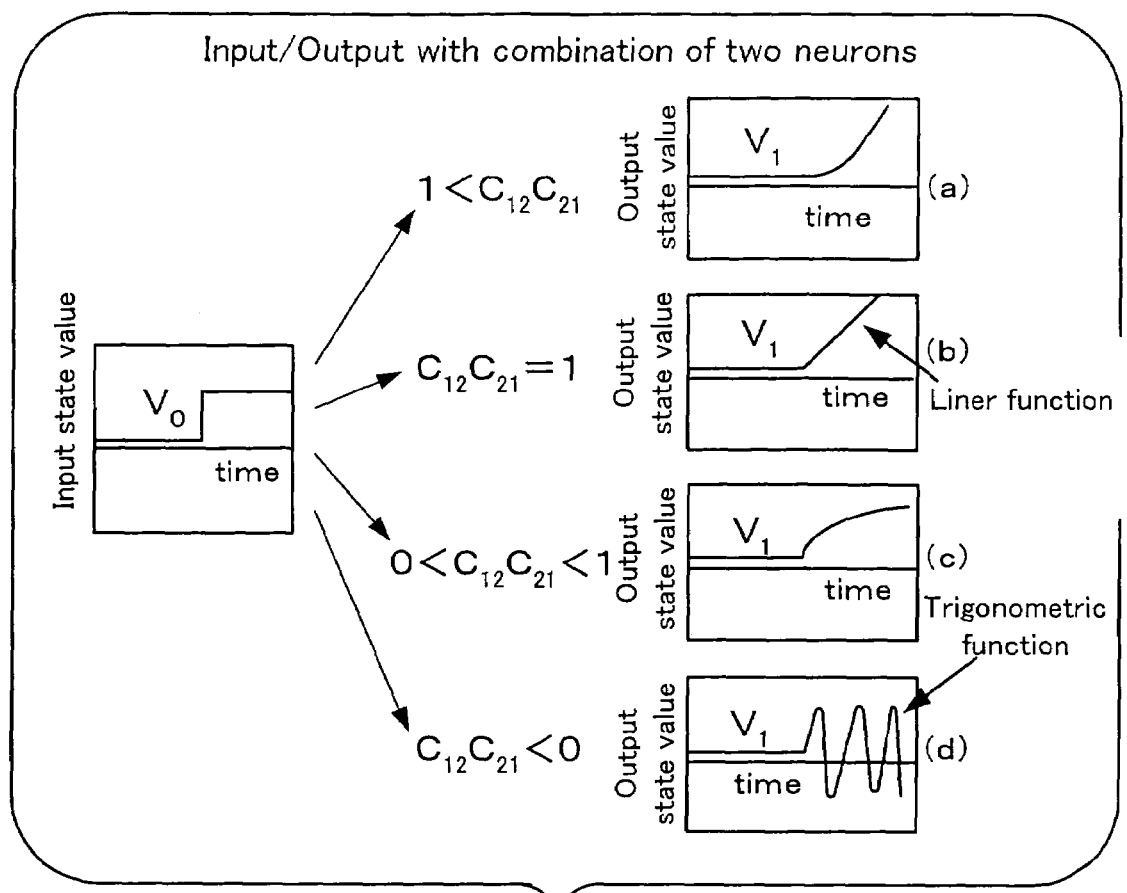
FIG. 24 is a diagram showing the input and output of two neurons in the combination as shown in FIG. 22.

FIG. 24 shows the input and output of two neurons in a combination as shown in FIG. 23.

When the input $V_0$ rises as a step function, its output $V_1$ changes as shown in Parts (a), (b), (c) and (d) of FIG. 24 according to $1 < C_{12}C_{21}$, $C_{12}C_{21} = 1$, $0 < C_{12}C_{21} < 1$ and $C_{12}C_{21} < 0$. It output $V_1$ is vibrated, depending on the value of weight $C_{12}$, $C_{21}$ (see Part (d) of FIG. 24), and the output is produced by integration and convoluting the lag (see Part (d) of FIG. 24).

Figure 25:
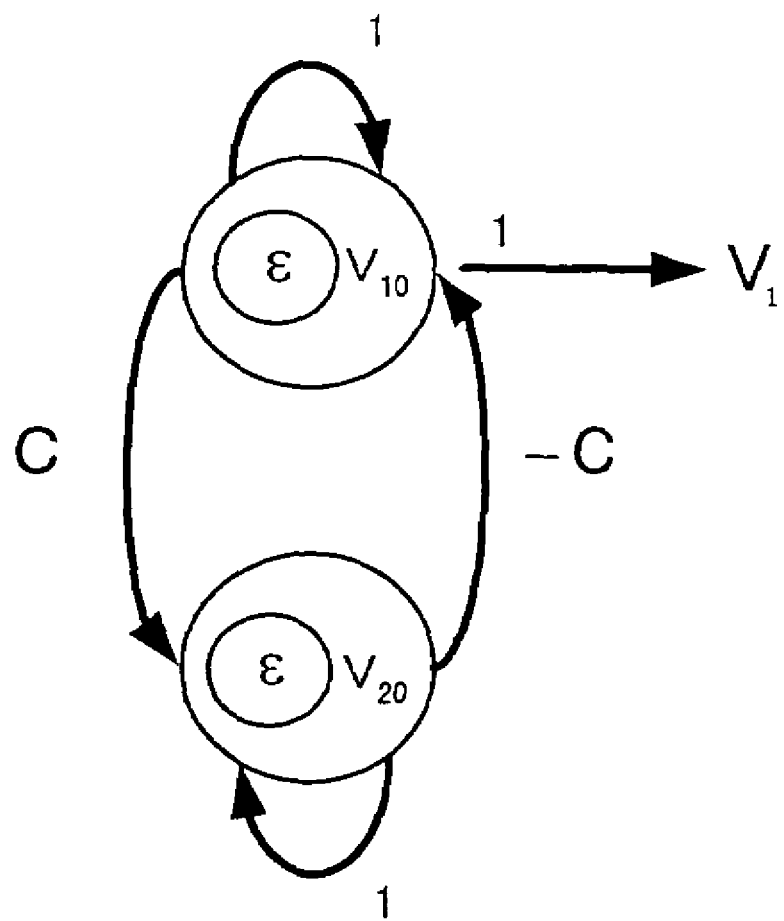
FIG. 25 is a diagram showing an example of a trigonometric function generator.

FIG. 25 shows an example of a trigonometric function generator.

Though there are shown here two neurons connected like two neurons of FIG. 23, the different points from the connection of two neurons of FIG. 23 are that the input $V_0$ does not exist, and the weights $C_{21}$, $C_{12}$ are C and –C having the same absolute value, and a different sign of positive or negative.

The output $V_1$ of FIG. 25 is represented by $$\frac{d^2 V_1}{dt^2} + \omega^2 V_1 = 0 \quad (13)$$

$$\omega = \frac{C}{\varepsilon}$$

Integrating the expression (13) is given by $$V_1 = c_1 \cos \omega t + s_1 \sin \omega t \quad (14)$$

$$c_1 = V_{10}$$

$$s_1 = -\frac{\varepsilon V_{20}}{C}$$

That is, the expression (13) or (14) represents a trigonometric function of angular frequency ω to produce the output $V_1$ that changes in sinusoidal manner.

From the expression (13) or (14), it will be found that the angular frequency of sinusoidal output $V_1$ can be changed by changing the value of weight C or lag ε, and the coefficients $c_1$, $s_1$ in the expression (14) are changed by changing the weight C, lag ε, initial values $V_{10}$, $V_{20}$, whereby the phase or amplitude of the sinusoidal wave is changed.

Figure 26:
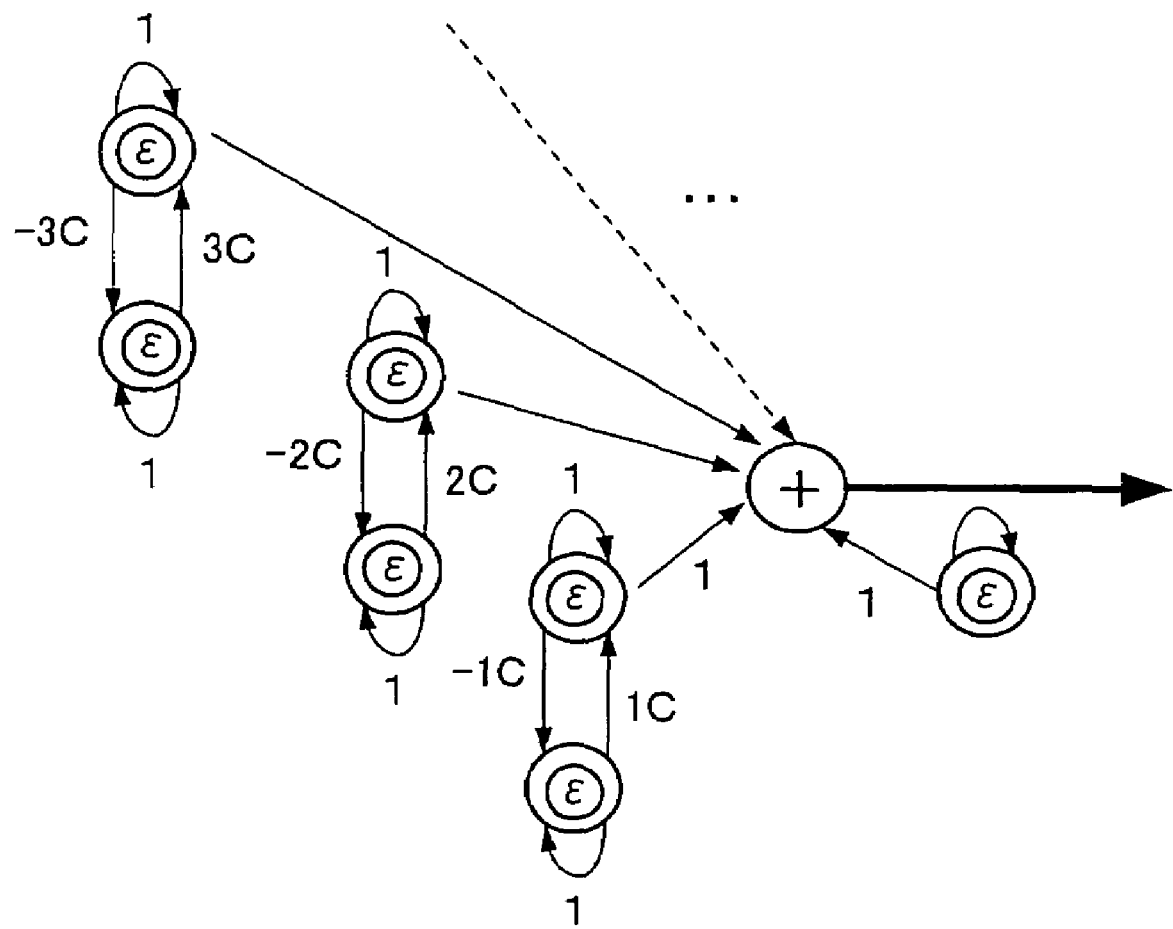
FIG. 26 is a diagram showing a partial network that is a combination of plural trigonometric functions as shown in FIG. 25.

FIG. 26 shows a partial network in which plural trigonometric function generators of FIG. 25 are combined.

In FIG. 26, one neuron on the rightmost side continues to output its initial value (here $c_0$ corresponding to the expression (15)).

A function implemented by the partial network of FIG. 26 is $$V_1 = c_0 + c_1 \cos \omega t + s_1 \sin \omega t + c_2 \cos 2\omega t + \quad (15)$$

$$s_2 \sin 2\omega t + c_3 \cos 3\omega t + s_3 \sin 3\omega t + \ldots$$

The constant term $c_0$, and $c_1$, $s_1$, $c_2$, $s_2$, ... are determined by the lag ε of each neuron, weights C, 2C, 3C, ... and the initial value (not shown in FIG. 26), as described with reference to FIG. 26 (see the expression (13) or (14)).

The expression (15) represents the Fourier series. Any periodic function can be expanded into the Fourier series, and accordingly constructed by combining plural sets of two neurons of FIG. 25 as shown in FIG. 26.

Figure 27:
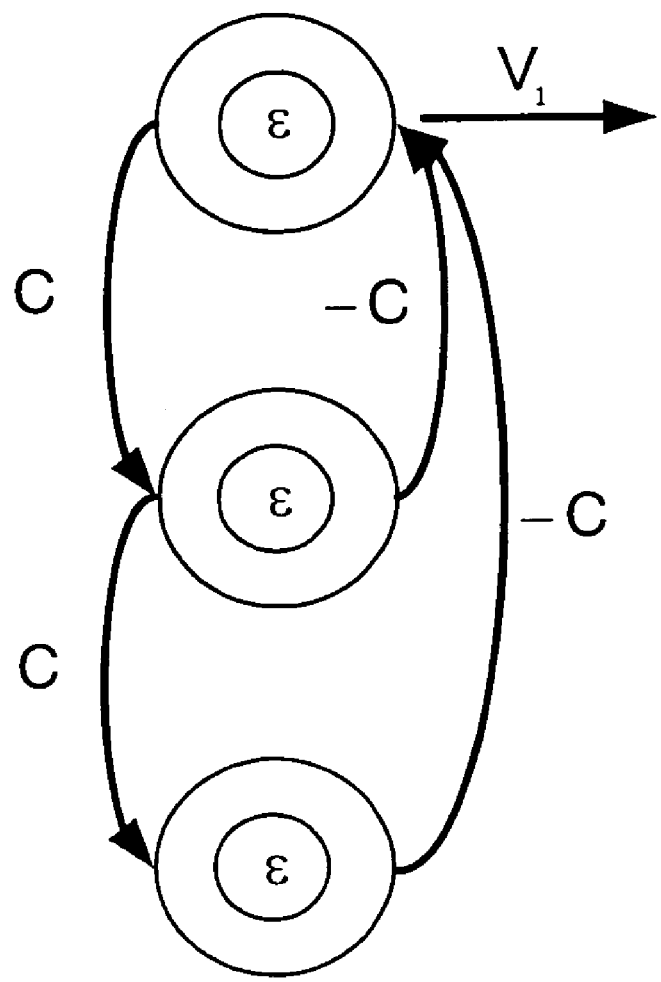
FIG. 27 is a diagram showing another example of the trigonometric function generator.

FIG. 27 shows another example of the trigonometric function generator.

The output $V_1$ generated by a combination of three neurons as shown in FIG. 27 is represented as $$\varepsilon^3 \frac{d^3 V_1}{dt^3} + 3\varepsilon^2 \frac{d^2 V_1}{dt^2} + \omega(3 - C^2) \frac{dV_1}{dt} + (1 - C^2 - C^3)V_1 = 0 \quad (16)$$

$$\text{For } C = \frac{12\sqrt[3]{-108 + 12\sqrt{93}}}{12 - \left(-108 + 12\sqrt{93}\right)^{2/3}} \quad (17)$$

the expression (16) is solved as $$V_1 = C_1 e^{-2t} + C_2 \cos(\omega t) + C_3 \sin(\omega t) \quad (18)$$

$$\omega = \frac{\frac{\sqrt{3}}{2} ca + \frac{2c}{a}}{\varepsilon}$$

$$c = \frac{12a}{12 - a^2}$$

Where $C_1$, $C_2$ and $C_3$ are integral constants determined by the initial values (not shown) of neuron.

Seeing V1 in the expression (18), the first term rapidly attenuates, and the second and third terms have sinusoidal vibration.

Accordingly, a combination of neurons as shown in FIG. 27 is utilized as a control signal to shift the initial transient position or attitude and then make the sinusoidal vibration, when the joint stationary at a certain position or attitude is shifted to a position or attitude (angle) different from the rest position or attitude, and vibrated sinusoidally around the position or attitude after shifting, for example.

Figure 28:
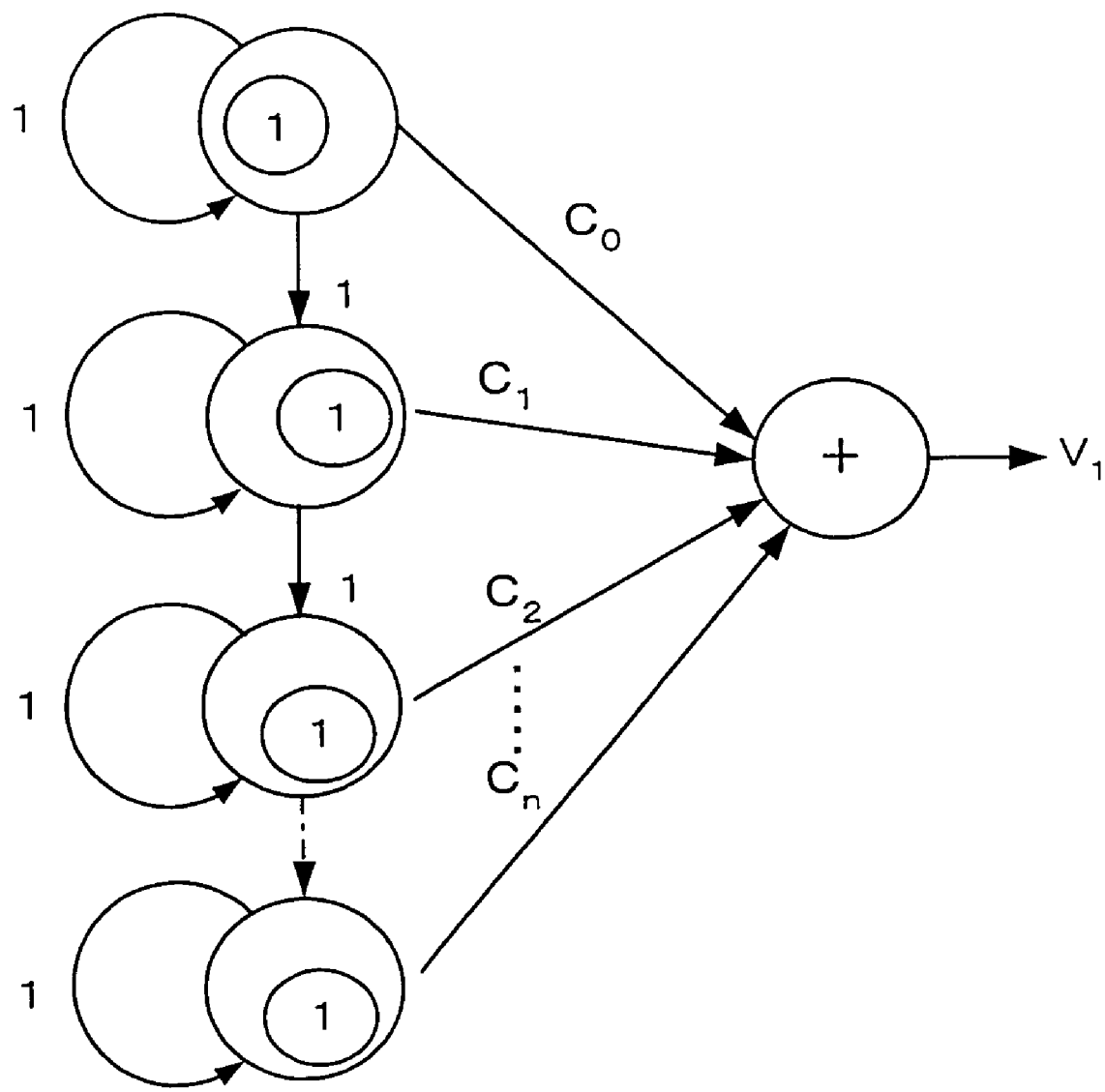
FIG. 28 is a diagram showing a generator for polynomial of n-th degree.

FIG. 28 shows a generator for polynomial of n-th degree.

In FIG. 28, a total of n+2 neurons are illustrated, including n+1 neurons (unit network consisting of a single neuron) generating the terms of a polynomial of n-th degree connected as shown in FIG. 28 and an addition neuron adding weighted outputs (neuron with a zero lag; see Part (E) of FIG. 10).

The output $V_1$ of the addition neuron is given by $$V_1 = C_0 + C_1 t + C_2 t^2 + \ldots + C_n t^n \quad (19)$$

As shown in FIG. 26, combining plural trigonometric functions produce any periodic signal to enable the robot to perform the periodic motion. However, employing the polynomial as shown in FIG. 28, an aperiodic signal is produced to enable the robot to perform the aperiodic motion (e.g., transition from a standing posture to a seated posture).

Figure 29:
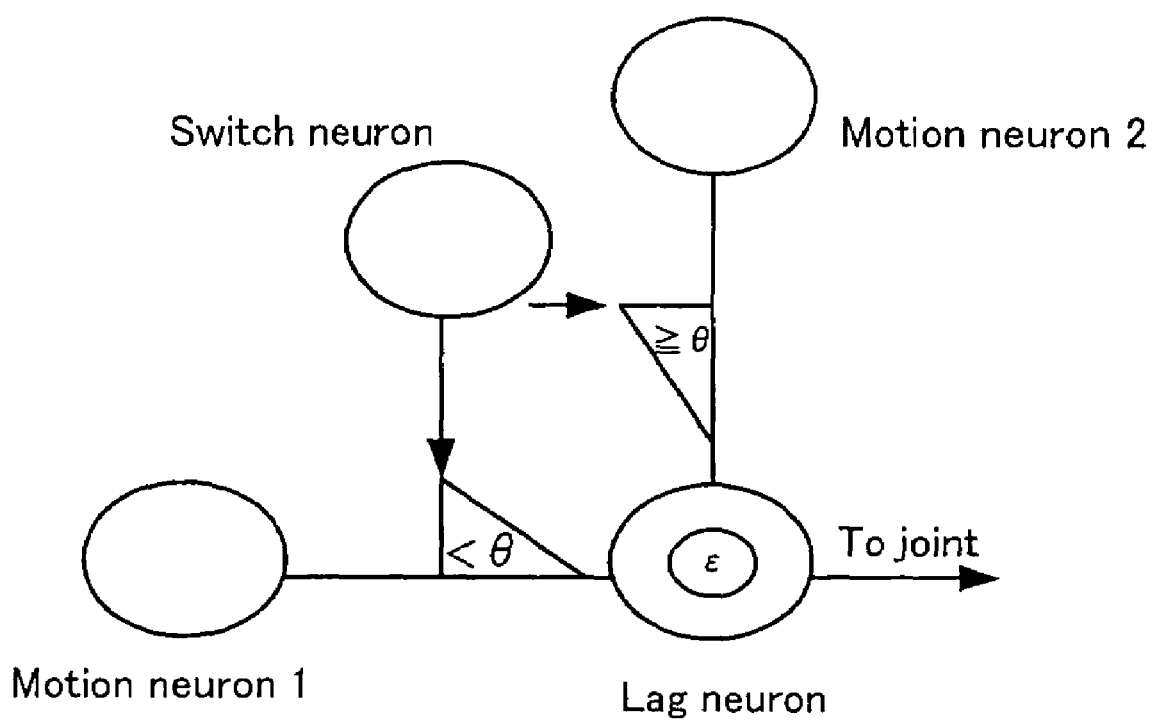
FIG. 29 is a diagram showing a combination of neurons in switching the motion.

FIG. 29 shows a combination of neurons in changing the motion.

Each of motion neurons 1, 2 is indicated as one neuron here, but behind it, there are a control signal generator instructing the periodic motion as shown in FIG. 26 and a control signal generator indicating the aperiodic motion composed of a polynomial generator as shown in FIG. 28. The motion neuron 1 and the motion neuron 2 are caused to perform mutually different motions (e.g., the motion neuron 1 performs a motion from the seated state to the standing state, and the motion neuron 2 performs a biped motion in the standing posture).

A switch neuron has a sequence program for enabling the sensor or robot to perform a series of operations behind it, in which the output is changed at a timing switching the motion. In the constitution as shown in FIG. 29, any one of the output of the motion neuron 1 and the output of the motion neuron 2 is inputted into the lag neuron in accordance with the output of the switch neuron. The lag neuron lags the input in analog manner in accordance with the expression (3) (or expression (4)).

In a control algorithm in which a dynamic equation as conventionally employed is set up, and the robot is operated in accordance with the dynamic equation, to enable the robot to transit from one motion to another, another dynamic equation (program) linking those two motions is needed, in which the program is varied depending on the combination of motions before and after transition, thereby requiring a number of programs, and taking a lot of time and labor to make the development and operation test.

On the contrary, employing the RNN as described here, two motions are switched by a switch neuron as shown in FIG. 29, and the output is produced via the lag neuron, irrespective of a way of transiting between transitable motions, whereby the time and labor to develop the control algorithm are greatly reduced in this regard.

Then, several simple combinations of the control algorithm composed of the RNN using the neuron as described so far, and the robot will be described below.

Figure 30:
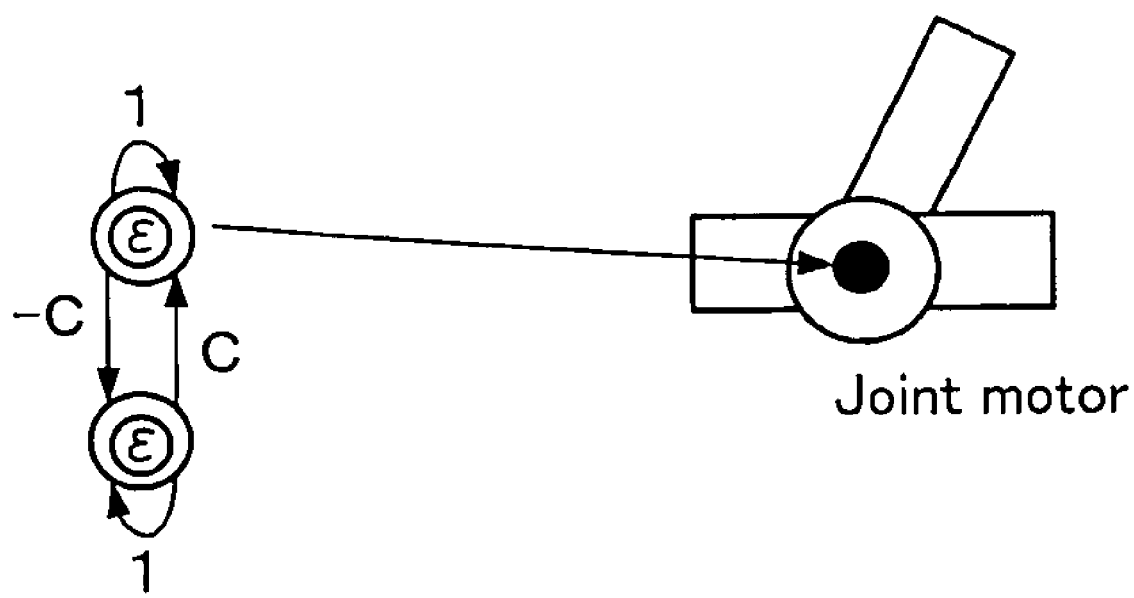
FIG. 30 is a diagram showing an RNN (see FIG. 25) composed of two neurons and producing a sinusoidal output and a robot having one joint.

FIG. 30 shows the RNN (see FIG. 25) consisting of two neurons to produce the sinusoidal output and the robot having one joint.

This robot includes a base extending transversely, and an arm rotated by receiving a driving force from a joint motor. A connected portion of the base and the arm is a joint.

When the output of the RNN is supplied to the joint motor moving the joint of the robot in FIG. 30, the arm of the robot is periodically motioned to the left or right in sinusoidal manner.

There are various circuit elements between the output of the RNN and the joint motor. For example, though the RNN is actually implemented by the program to produce digital output by executing the program on the computer, a D/A converter that converts the digital output to analog signal, and a power amplifier that supplies power to the joint motor are interposed. Those circuit elements are not essential for the description here and all omitted.

Figure 31:
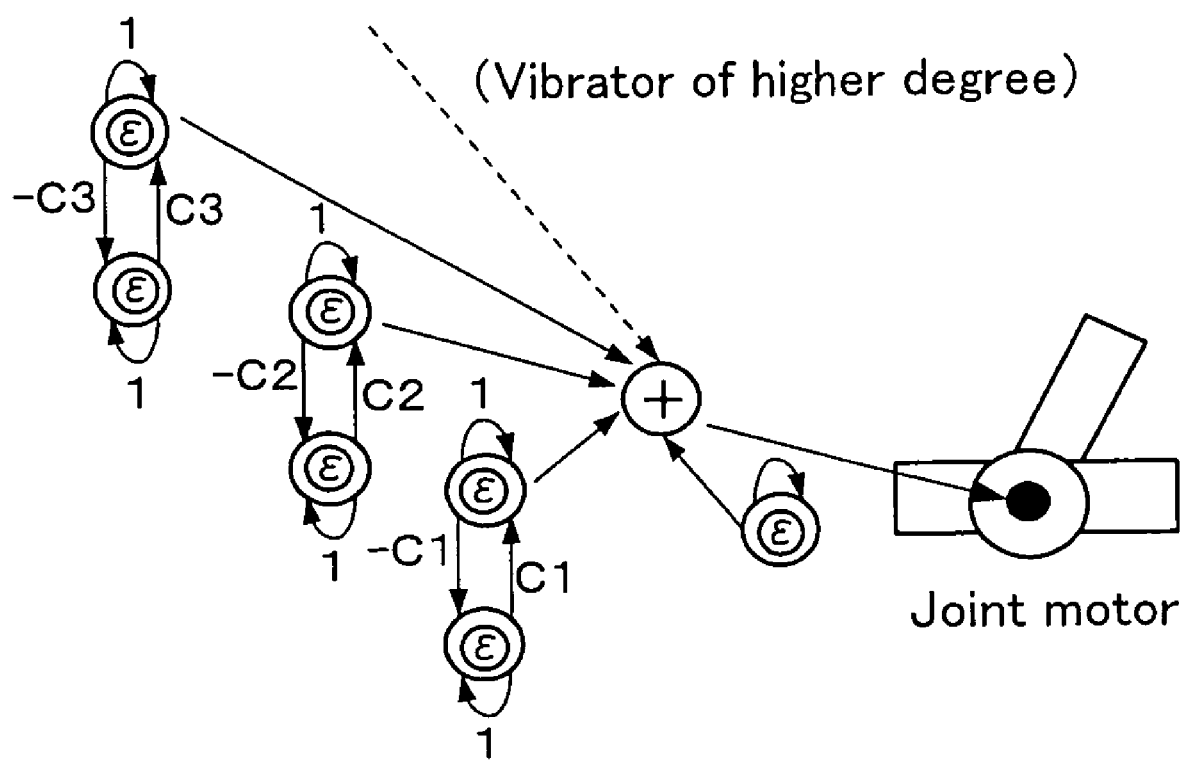
FIG. 31 is a diagram showing the constitution in which an arm of the robot performs arbitrary periodic motion.

FIG. 31 shows the constitution that enables the arm of the robot to perform arbitrary periodic motion.

As described previously by referring to FIG. 26, a periodic signal having any periodic waveform can be generated using the plural trigonometric function generators generating the outputs of different frequencies.

By supplying this periodic signal to the joint motor of the robot, the arm is enabled to perform the periodic motion according to the periodic signal.

Figure 32:
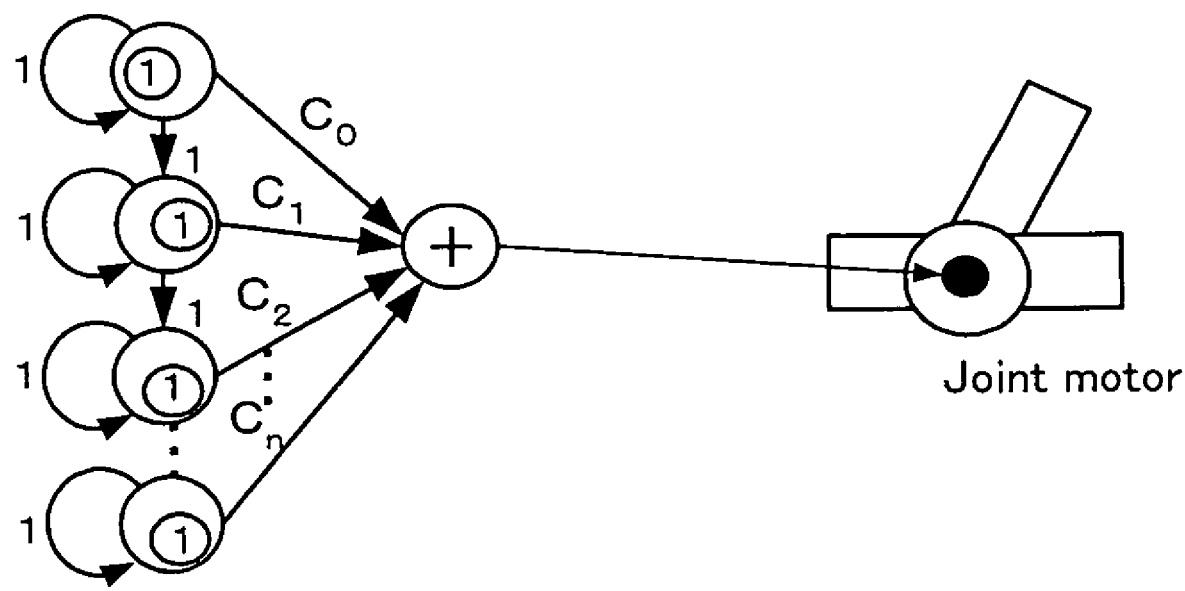
FIG. 32 is a diagram showing the constitution in which an arm of the robot performs arbitrary aperiodic motion.

FIG. 32 shows the constitution that enables the arm of the robot to perform the aperiodic motion.

In FIG. 32, the robot has the RNN of the same constitution as in FIG. 28 and one joint.

Employing the constitution as shown in FIG. 28, an aperiodic function represented by a polynomial of any degree (n-th degree). By driving the robot of FIG. 32 according to the output of the aperiodic function, the arm of the robot is enabled to perform the aperiodic motion to be implemented by the polynomial.

Then, an example of the PID control that is implemented with the RNN composed of a combination of neurons as described so far will be described below.

The PID control is the feedback control in which proportion (P), integration (I) and differentiation (D) are combined, and conventionally widely employed.

Figure 33:
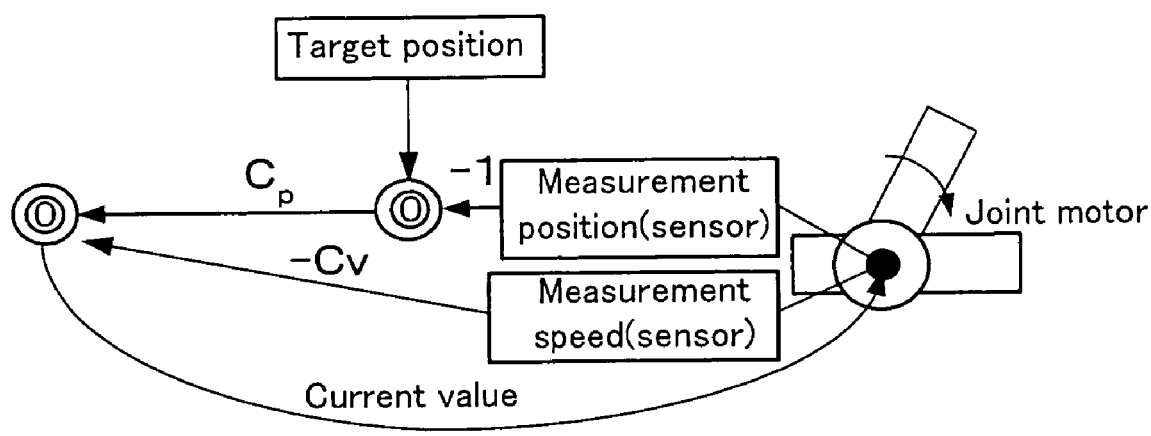
FIG. 33 is a diagram showing an example of PD control excluding the integration (multiplication).

FIG. 33 shows an example of the PD control excluding the integration (I).

In FIG. 33, the robot also has one joint as in FIGS. 30 to 32.

There are a sensor that measures the position (angle) of the joint, and a sensor that measures the speed (angular velocity) of motion of the joint. Instead of the speed (angular velocity) sensor, the output of the position (angle) sensor may be differentiated to acquire the speed (angular velocity) information.

The RNN of FIG. 33 is represented in the following expression.

$$\text{Current value} = C_p \times (\text{target position} - \text{measurement position}) - C_v \times \text{measurement speed} \quad (20)$$

The first term in the right side of the expression (20) is the proportional term (P), and the second term is the differential term (D).

Figure 34:
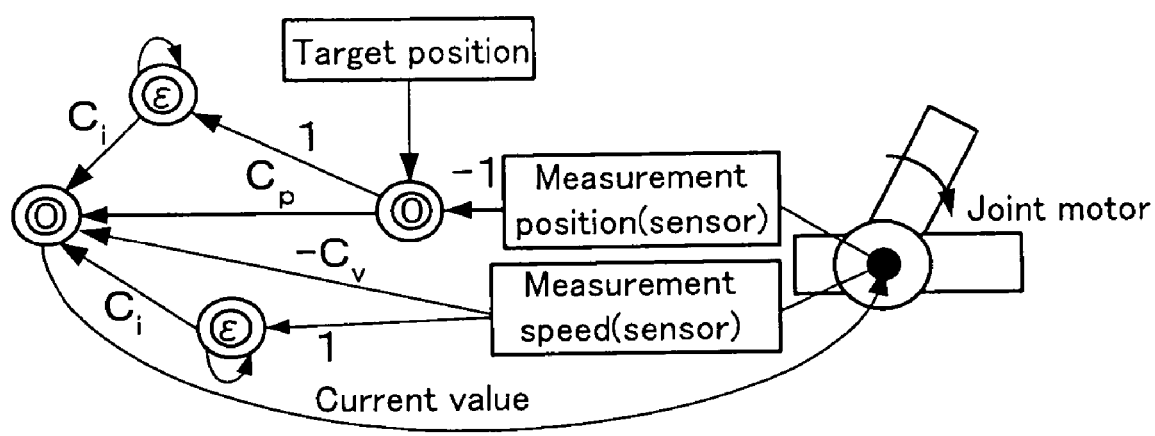
FIG. 34 is a diagram showing an example of PID control.

FIG. 34 shows an example of the PID control.

In FIG. 34, the RNN as shown in FIG. 32 has further the constitution of integration (I). The RNN of FIG. 33 is represented in the following expression.

$$\text{Current value} = C_p \times (\text{target position} - \text{measurement position}) - C_v \times \text{measurement speed} + C_i \times \partial (\text{target position} - \text{measurement position}) \quad (21)$$

The first term and the second term in the right side of the expression (21) are the proportional term (P) and the differential term (D), like the first term and the second term of the expression (20) as described with reference to FIG. 33, and the third term in the right side of the expression (21) is the integral term (I).

Figure 35:
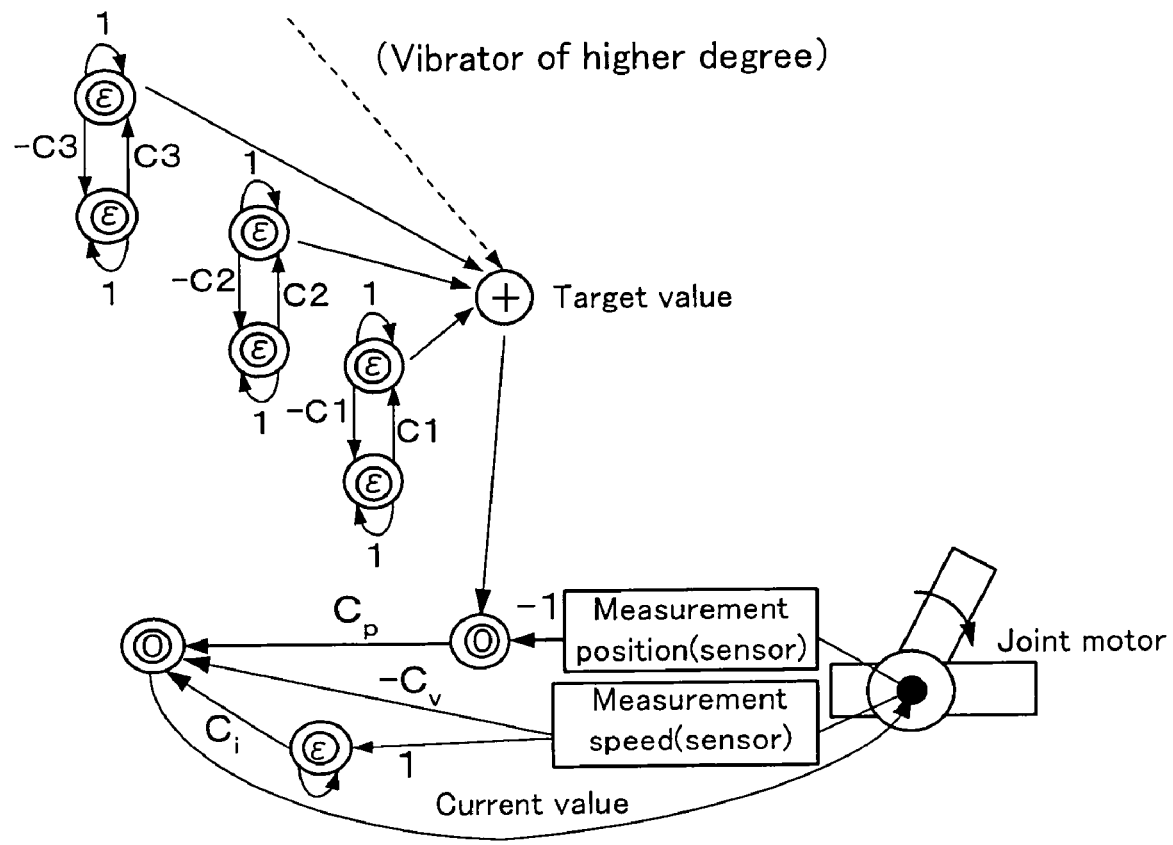
FIG. 35 is a diagram showing another example of PID control.

FIG. 35 shows another example of the PID control.

Though the target position is the fixed value in the case of FIG. 34, the target position is periodically changed in FIG. 35. In this way, the joint motor is driven to follow the target value periodically changing under the PID feedback control.

As shown in FIG. 33 to 35, the PID control is implemented by the RNN using the neurons as described so far.

Figure 36:
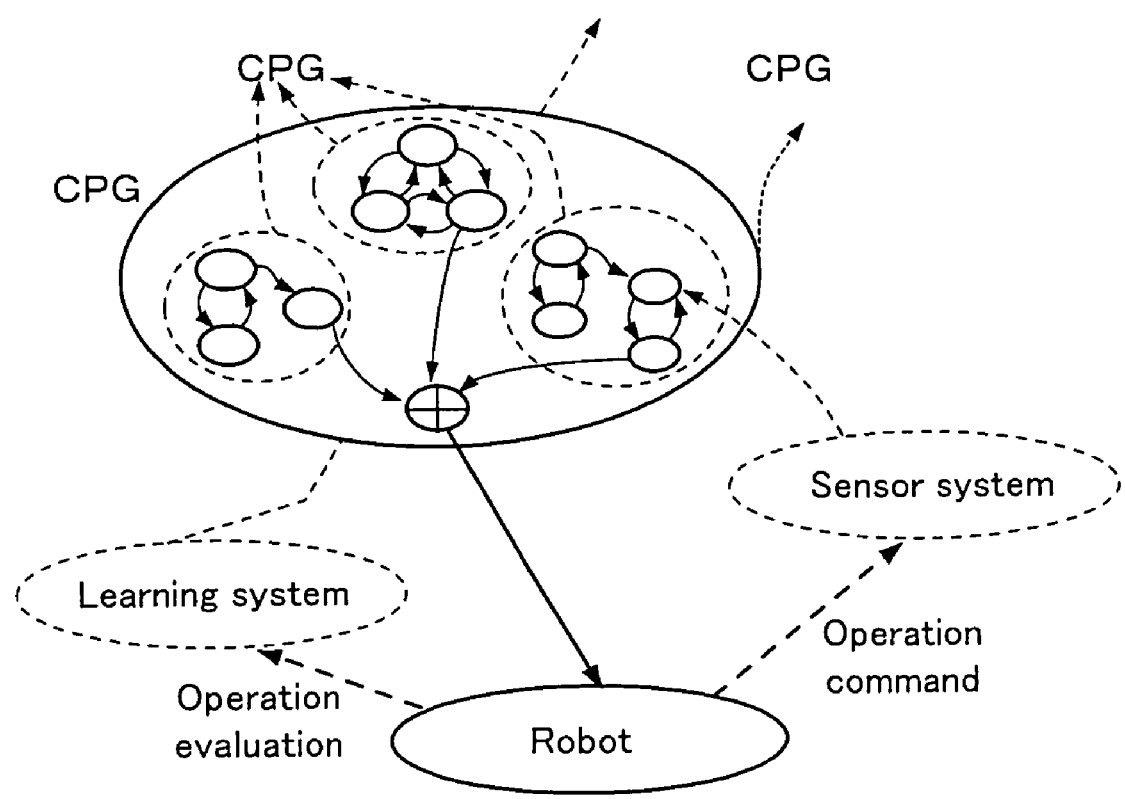
FIG. 36 is a concept diagram of an overall system including a robot and a control algorithm controlling the robot.

FIG. 36 is a concept diagram of an overall system including the robot and the control algorithm controlling the robot.

CPG in FIG. 36 is the abbreviation of Central Pattern Generator, indicating the partial network with the RNN here. The control algorithm controlling the robot is a collection of many CPGs.

Each of many CPGs (partial network) composing the control algorithm takes charge of one motion in the robot of control object. A specific example will be described later with reference to FIG. 37.

In determining various kinds of undetermined coefficients (lag $\epsilon$, weight C, initial value of each neuron) the operation of the robot is evaluated, and its evaluation value is passed to a learning system, where each coefficient value is determined. A determination method of coefficient value will be described later.

The operation of the robot is measured by a sensor system and passed to the control algorithm, which controls the robot to perform the desired operation based on the information from the sensor system.

Figure 37:
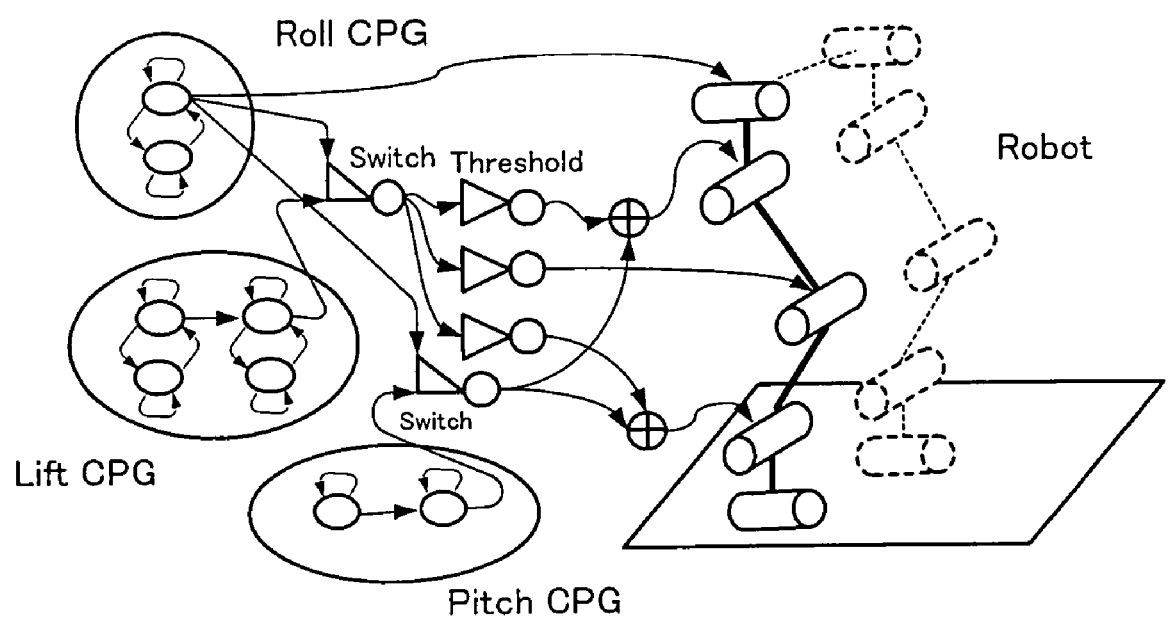
FIG. 37 is a schematic diagram showing a leg of the biped robot and the RNN that controls the motion of the leg.

FIG. 37 is a schematic diagram of the leg of the biped robot and the RNN controlling the motion of the foot.

Herein, the joint of the robot is indicated by column, and the RNN controls the motion of a right leg among both the left and right legs.

Herein, as the CPG, a roll CPG, a lift CPG and a pitch CPG are needed to enable the biped robot to perform the forward walking.

When the robot walks forward, the weight shift on the left and right legs is made, but the roll CPG is the partial network generating a control signal controlling the motion for its weight movement.

In the forward walking, as the weight shift on the left and right legs is made alternately and periodically, the roll CPG controlling the motion generates the periodic signal.

Also, in enabling the robot to walk forward, it is required to move the left and right legs alternately up and down. The lift CPG as shown in FIG. 37 is the partial network that moves the right leg up and down. The up-and-down motion of the leg is also the periodic motion. Accordingly, the lift CPG also generates the periodic signal.

Also, to enable the robot to walk forward, it is required to move forward the left and right legs alternately. The pitch CPG as shown in FIG. 37 is the partial network that moves forward the right leg. The motion of advancing the leg once is aperiodic, whereby the pitch CPG is configured as the partial network generating the aperiodic signal with the polynomial.

The output of the lift CPG is switched by the output of the roll CPG. This is made to prevent the right leg from being lifted before the weight (center of gravity) is fully shifted to the left leg. Similarly, the output of the pitch CPG is switched by the output of the roll CPG. Also, this is made to prevent the right leg from being moved forward before the weight (center of gravity) is fully shifted to the left leg. Furthermore, the output of the lift CPG and the output of the pitch CPG are regulated by the threshold. This is a measure for maintaining the right leg in a state where the right leg makes contact with the floor by preventing the right leg from being stretched or moved forward after the right leg is advanced to make the sole of foot contact with the floor.

In this way, the CPG for making the periodic motion and the CPG for making the aperiodic motion are combined to implement a complex motion as a whole.

Then, the flow of a process for constructing the control algorithm of the robot will be described below. To construct the control algorithm, besides the process for assembling the RNN as described so far, it is necessary to determine various kinds of coefficients (coefficients concerning the lag, weight and initial value of each neuron) included in the RNN. Herein, the system that constructs the control algorithm composed of the RNN including determining the coefficient values is referred to as a "learning system" (see FIG. 36).

Herein, in determining the coefficient values of the RNN, as a precondition for a way of thinking, it is assumed that the motion, or a temporal change in the position or angle of the joint, is the solution of the non-linear equation. To obtain the solution of this non-linear equation, there is a method employing the new non-linear equation. However, it is difficult for a processing system with higher-level judgement function to control the method of non-linear equation, because the solution generation scheme itself contains a non-linear element. Thus, the motion is solved here by a method of successive approximation.

In the celestial mechanics or hydrodynamics, a method of perturbation is well known to solve the non-linear equation approximately. The method of perturbation involves obtaining a solution of a soluble linear differential equation as the first approximate solution, and modifying the solution successively to obtain the approximate solution in solving the non-linear equation in the celestial mechanics. In this method of perturbation, the term necessary for modification is called the perturbation term. Usually, the calculation is based on the Taylor's expansion. In the celestial mechanics, the equation to be solved is known beforehand, directly substituting the expanded solution for the equation to be solved and solving it for each degree to obtain the successive solution. In the normal method of perturbation, the solution successively approaches to the true solution when the degree of approximation is raised.

Herein, the above idea is applied to the equation of motion for the robot. The non-linear equation of motion for the robot is expected to be the very complex relation expression of the material value such as mass, joint viscosity, motor maximum torque of the robot, the friction coefficient or inclination of the floor, and the shape of room in terms of the motion of walking. In an ideal case, this non-linear equation is set up, and theoretically analyzed. However, considering that the robot performs various motions, it is very difficult to know this non-linear equation beforehand.

Thus, it is supposed here that the problem is solved without setting up the equation to be solved, unlike the celestial mechanics in which the equation to be solved is known beforehand. In the method of perturbation used in the celestial mechanics, the solution is obtained from the lower to higher degree. Herein, similarly, the solution is expanded according to an eigen function in the following manner, and the coefficients are numerically obtained successively from the lower degree by trial and error. The degree is raised until the satisfactory motion is obtained.

$$y = \delta_0 y_0 + \delta_1 y_1 + \delta_2 y_2 + \delta_3 y_3 + \ldots \quad (22)$$

Where $y_i$ is the eigenfunction, $\delta_i$ is its coefficient, and i is the degree.

This method is referred to as an NP method (Numerical Perturbation method). Herein, a motion learning system (CPG/NP) in which the CPG model and the NP method are used at the same time will be described. The CPG model generates the trigonometric function or polynomial that is the basic function, as previously described, and further a few kinds of orthogonal functions, though not described. Employing these basic functions, an unknown non-linear equation representing the motion is solved.

Supposing that the motion (position or angle) of the k-th joint is $\theta_k(t)$, the CPG is represented as $$\theta_k(t) = c_0 + \sum_{j=1}^{n}(c_j \cdot \cos j\omega t + s_j \cdot \sin j\omega t) + \sum_{j=1}^{n} a_j \cdot t^j \quad (23)$$

Where $c_j$, $s_j$ and $a_j$ are coefficients relating to the lag, weight and initial value of the neuron (see the expressions (13) to (15), and (19)). The first term in the right side of the expression (23) is a constant term $c_0$, the second term is the term of periodic function, and the third term is the term of aperiodic function. Herein, the addition with $\Sigma$ in the expression (23) is decomposed into terms, in which each unit network is generated corresponding to each term. Herein, the coefficient values are acquired in order from the term having the lowest value of j (term having the lowest angular frequency $j\omega$ or the longest period for the second term in the right side of the expression (23), and term having the lowest degree for the third term in the right side of the expression (23)) to construct the network. Herein, first of all, $c_0$ is obtained, and then the coefficients $c_1$, $s_1$ and $a_1$ in the expression (23) are obtained. At this time, other coefficients $c_j$, $s_j$ and $a_j$ (j=2, 3, . . . , n) are all made zero. If the coefficients $c_1$, $s_1$ and $a_1$ are obtained, then the coefficients $c_2$, $s_2$ and $a_2$ are obtained. At this time, the coefficients $c_1$, $s_1$ and $a_1$ obtained ahead are fixed, and other coefficients $c_j$, $s_j$ and $a_j$ (j=3, 4, . . . , n) are all made zero. This is repeated for $c_j$, $s_j$ and $a_j$.

With the NP method, the coefficients are determined successively in the above manner.

The definition storage section 411 of the robot control algorithm construction device 410 as shown in FIG. 9 stores the unit network corresponding to each term of the expression (23) and generated beforehand. Alternatively, the definition storage section 411 may store the algorithm for generating the unit network, and the control algorithm control section 412 may automatically generate the unit algorithm as necessary.

Figure 38:
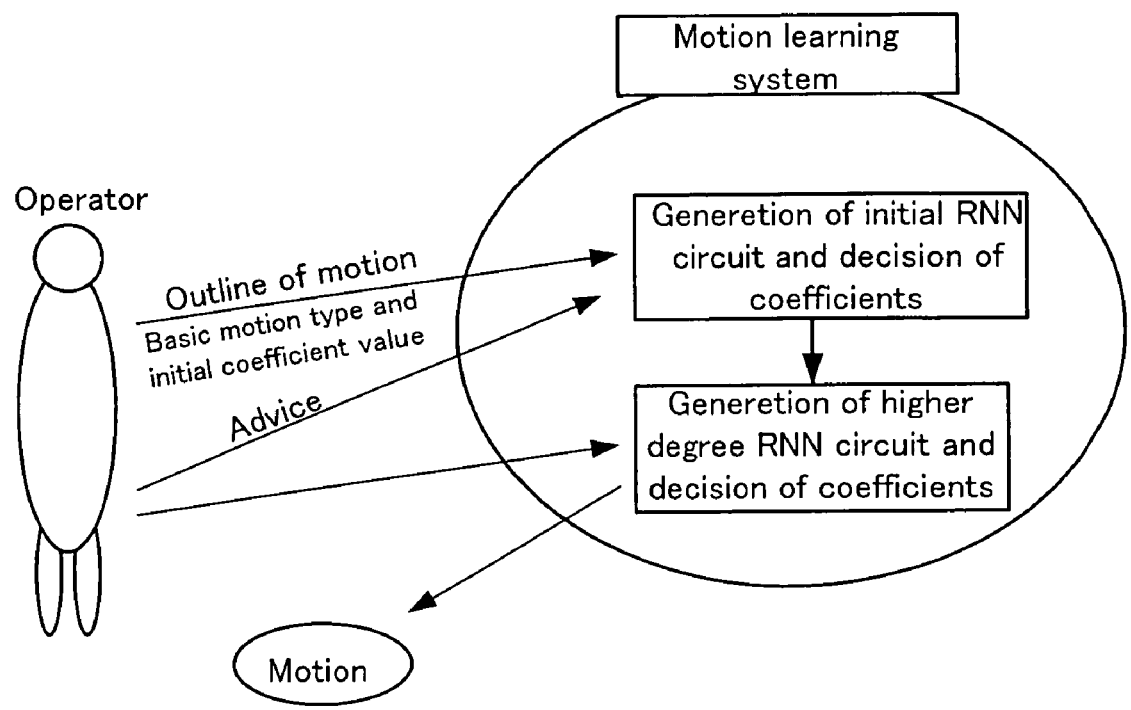
FIG. 38 is a diagram showing the outline of a motion learning system of the robot.

FIG. 38 shows the outline of the motion learning system of the robot.

Herein, first of all, the operator enters a basic motion type and the initial coefficient values. The basic motion type means whether the CPG to determine the coefficients at this time is the periodic motion type or the aperiodic motion type. If the CPG of periodic motion is instructed, the first term and the second term in the right side of the expression (23) are only effective, and the third term is unnecessary. On the other hand, if the CPG of aperiodic motion is instructed, the first term and the third term in the right side of the expression (23) are effective, and the second term is unnecessary.

The "advice" in FIG. 38 is an evaluation function. The evaluation function is the function that determines whether or not the motion is satisfied. In a complex system, there are plural evaluation functions of the "energy minimum", "stability of robot main body" and "high speed". To make the extremal problem, the evaluation function E is made a linear weighted sum of plural evaluation functions $E_i$ in the following way. $E_i$ is a non-negative number given in quadratic form, and $c_i$ is a weight of the evaluation function $E_i$. Herein, the evaluation function E is called the advice.

$$E = \sum_{i=1}^{m} C_i E_i \quad (24)$$

The control algorithm generation section 412 of the robot control algorithm constructing apparatus 410 as shown in FIG. 9 has the basic motion type and the initial coefficient values specified by the operator. First of all, the initial position (initial angle) $c_0$ of the function k is specified. This $c_0$ is the initial position or initial angle of the joint, when the joint is in the still state (before starting the motion), or in the initial state inherited from the previous motion. Then, the basic motion type is specified to be a periodic motion type, for example. Then, the control algorithm generation section 412 of the robot control algorithm constructing apparatus 410 as shown in FIG. 9 accepts its specification and reads (or generates at that time) from the definition storage section 411 the basic network $$\theta_k = c_1 \cos \omega t + s_1 \sin \omega t \quad (24)$$

At this time, the basic expression of motion, including the initial position (initial angle) $c_0$, is given by $$\theta_k = c_0 + c_1 \cos \omega t + s_1 \sin \omega t \quad (25)$$

The basic period (angular frequency $\omega$) of the periodic motion, and the initial value of each coefficient $c_1$, $s_1$ are given from the operator. The coefficient value determination section 413 of the robot control algorithm constructing apparatus 410 of FIG. 9 temporarily determines the lag, weight and initial value of each neuron constructing the basic network with $\omega$, $c_1$ and $s_1$.

The output of the basic network having the initial coefficient values generated in this way is given to the robot, whereby the motion of the robot is evaluated. The coefficient value is modified little by little according to this evaluation, and the coefficients $c_1$, $s_1$ are determined to have the highest evaluation at the stage of the degree.

Though the coefficient values may be determined by the operator making the evaluation of motion for the robot with the eyes, the coefficient values may be automatically determined according to the predetermined advice, or semi-automatically determined including the opinion of the operator.

If the coefficients $c_1$, $s_1$ in the expression (25) are determined ($c_0$ is already determined), the lag, weight and initial value of the neuron making up the basic network represented in the expression (24) are correspondingly determined (see the expression (14)). The control algorithm generation section 412 of FIG. 9 reads (or generates) the basic network implementing the term of next degree from the definition storage section 411, and connects it to the partial network of lower degree as previously obtained. This is represented in the following expression.

$$\theta_k = c_0 + (c_1 \cos \omega t + s_1 \cos \omega t) + (c_2 \cos 2\omega t + s_2 \sin 2\omega t) \quad (26)$$

Where the coefficients $c_0$, $c_1$ and $s_1$ are already determined, and the initial values of new coefficients $c_2$, $s_2$ are given by the operator. The coefficients $c_2$, $s_2$ are associated with the lag, weight and initial value of the neuron making up the unit network implementing the term of the degree, like the coefficients $c_1$ and $s_1$. The coefficient value determination section 413 of FIG. 9 determines the coefficients $c_2$, $s_2$ by giving the robot the output of the partial network corresponding to the expression (26) when the initial values are given as the coefficients $c_2$, $s_2$, evaluating the motion of the robot at that time, and adjusting the coefficient values $c_2$, $s_2$ in a direction of increasing the evaluation to attain the highest evaluation at the degree.

If the coefficients $c_2$, $s_2$ are determined, the control algorithm generation section 412 of FIG. 9 reads (or generates) the basic network implementing the term of next degree from the definition storage section 411, and connects it to the partial network (with determined coefficients) that is already evaluated. This is represented in the following expression.

$$\theta_k = c_0 + (c_1 \cos \omega t + s_1 \sin \omega t) + (c_2 \cos 2\omega t + s_2 \sin 2\omega t) + (c_3 \cos 3\omega t + s_3 \sin 3\omega t) \quad (27)$$

The initial values of new coefficients $c_3$, $s_3$ are given, and the above process is performed, whereby the coefficient values $c_3$, $S_3$ are determined.

Thus, the coefficients are successively determined up to the degree that enables the robot to perform the motion with the required precision.

Though the periodic function is taken here as an example, the coefficient determination process for the aperiodic function is the same.

Though in the above description, all the initial coefficient values are given by the operator, the initial values that are determined at will or predetermined may be automatically given as the coefficient values, and the coefficient values may be determined by changing them successively, beginning with the initial values automatically given.

By programming not only giving the initial values but also specifying the basic motion type, reading (or generating) the basic network, and evaluating the motion of robot, all the procedure from generating the partial network to determining the coefficients of the partial network may be automated. Or the procedure may be semi-automatically performed by partially entrusting the operator with an operation, or presenting the result of automatic generation to the operator to obtain the approval.

Also, though the output of the partial network having the coefficients at the initial values is directly given to the robot in the above description, the output may be firstly given to the robot as the algorithm constructed in the computer as shown in FIGS. 6 and 7, to make the operation simulation, in which after confirming that the robot is operated at sufficient precision, the robot is actually operated.

Figure 39:
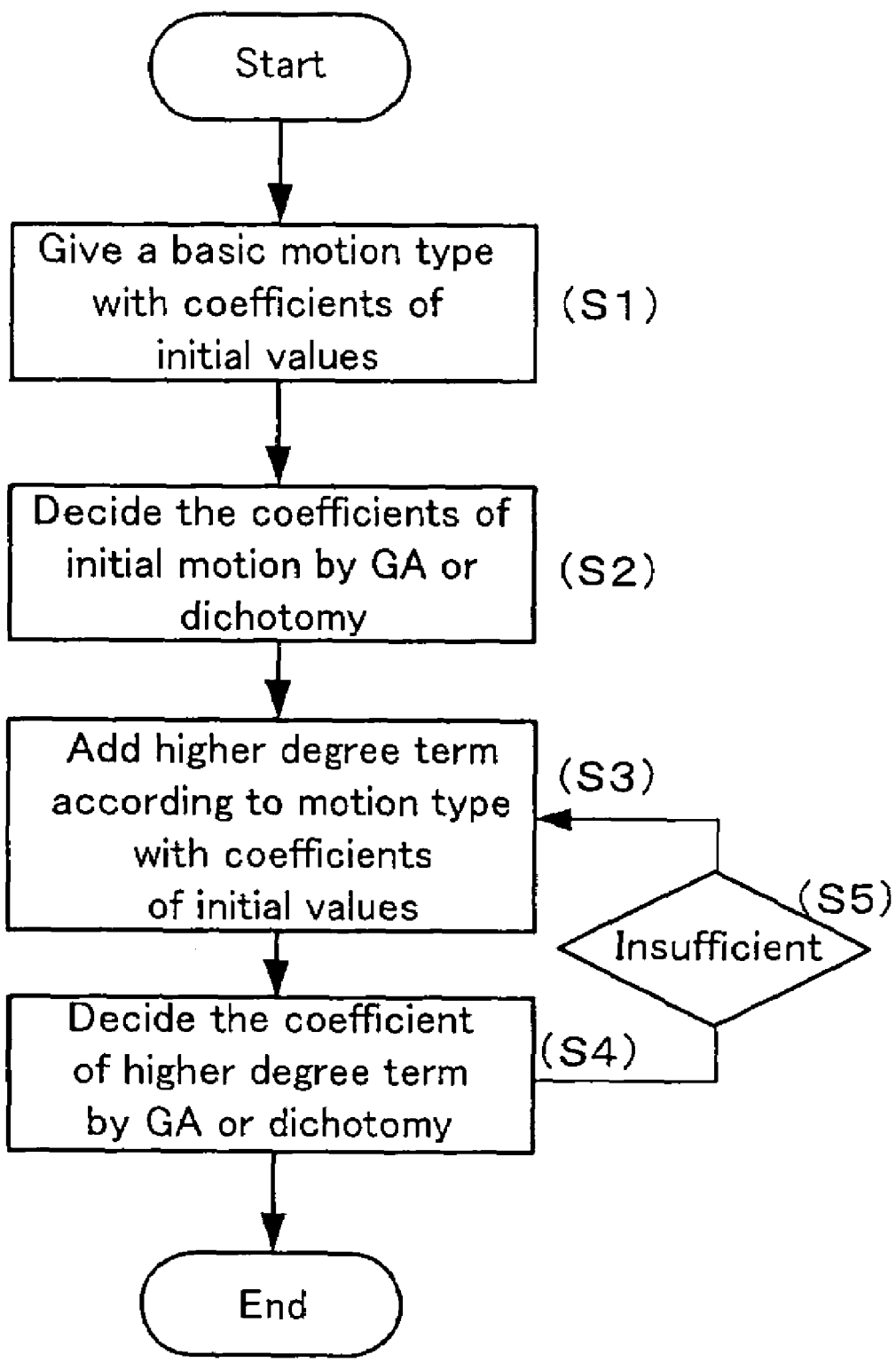
FIG. 39 is a flowchart summarizing the learning process.

FIG. 39 is a flowchart summarizing the learning process.

First of all, the basic motion type is given. The coefficients start from the initial values (step S1).

The coefficients of initial motion starting from the initial values are determined by using a coefficient determination algorithm such as GA (genetic algorithm) or dichotomy (step S2), the term of higher degree is added according to the motion type (step S3), and the coefficients of higher degree are determined using the GA or dichotomy (step S4). When the motion of the robot of control object has less sufficient precision (step S5), the term of higher degree is added according to the motion type and the initial value is given to the added coefficient in the term of higher degree (step S3), whereby the coefficient of the term of higher degree is determined using the GA or dichotomy (step S4). This is repeated until the robot can perform the motion at sufficient precision.

Then, the comparison result between the CPG/NP (method of sequentially acquiring the coefficients of CPG by the NP method) and the CPG/GA (method of acquiring the coefficients of CPG at a time employing the GA (genetic algorithm)) will be described below.

In the CPG/GA, all the coefficients are obtained at the same time. Therefore, all the coefficients are related with each other. When the motion is slightly changed, all the coefficients are affected, possibly taking some time to change it. Herein, as a case of producing the greatest difference, searching all the solutions will be simply considered. Assuming that the resolution of neuron value and the resolution of connection weight are both n, and a sum of the final number of neurons and the number of connections between neurons is m, the computation amount is equivalent to $n^m$ trials in searching all the solutions. When divided at the j-th degree in the CPG/NP, the computation amount is equal to about $j \times n^{m/j}$. Specifically, when n=16, m=60 and j=5, $n^m = 1.15 \times 10^{73}$ and $j \times n^{m/j} = 1.4 \times 10^{16}$, in which there is a difference of about $10^{57}$ times. In a positive experiment on the actual machine, with the CPG/GA, no solution corresponding to the solution acquired by the CPG/NP has been found up to now. Moreover, the CPG/NP method has the features, which do no exist in the CPG/GA, that the evaluation function is reset at the end of each perturbation degree and the number of neurons is easily changed.

In this manner, the CPG/NP allows the coefficients to be determined in a very short time at the level faster by astronomical number of digits than the conventional method.

Figure 40:
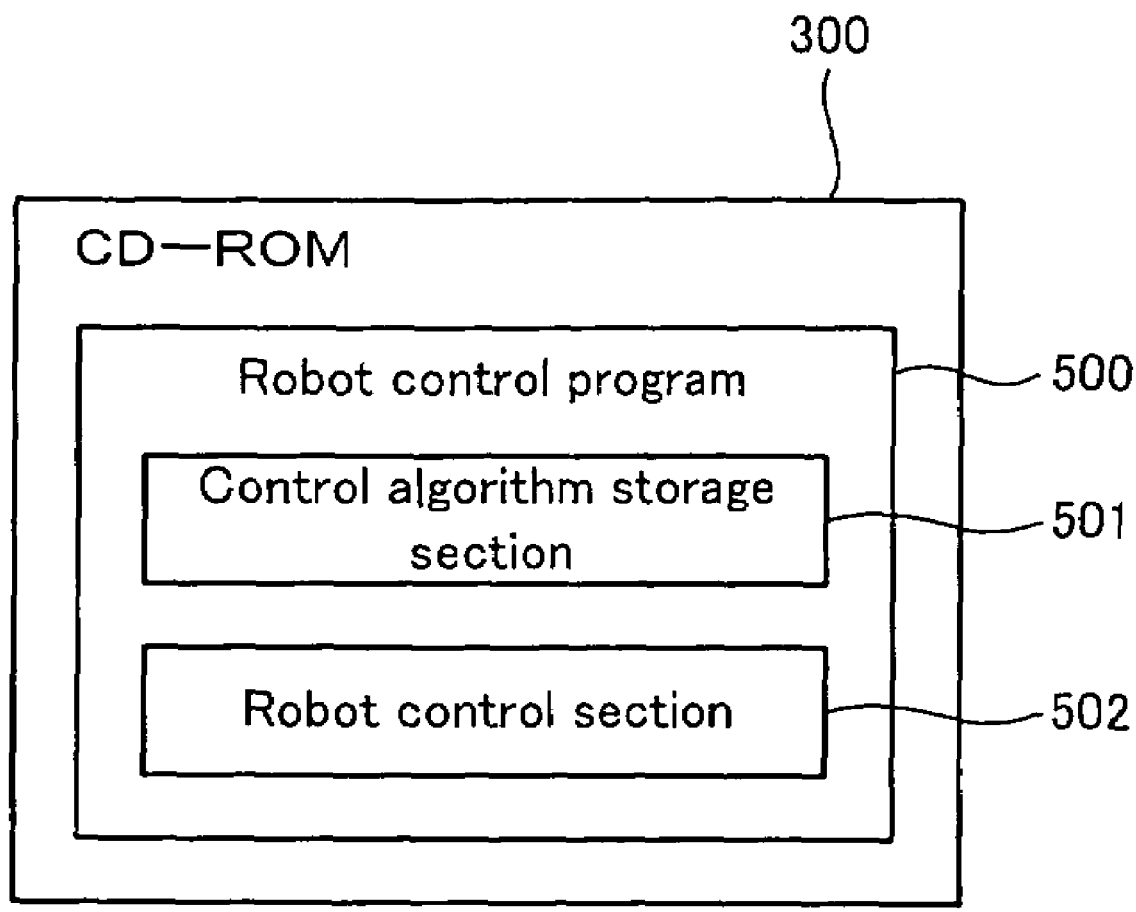
FIG. 40 is a typical diagram showing one embodiment of a robot control program storage medium according to the invention.

FIG. 40 is a schematic diagram showing the outline of one embodiment of a robot control program storage medium according to the invention.

Herein, this robot control program 500 is stored in a CD-ROM 300 that is an embodiment of the robot control program storage medium according to the invention, which is loaded from a CD-ROM loading opening 101b as shown in FIG. 6 and accessed by a CD-ROM drive 115 of FIG. 7, whereby the robot control program 500 stored in the CD-ROM 300 is installed into the computer 100 as shown in FIGS. 6 and 7. The robot control program installed into the computer 100 is executed within the computer 100, the computer 100 is operated as one embodiment of a robot controller according to the invention.

Though this robot control program 500 is stored in the CD-ROM 300 in this example, it does not need to be stored in the CD-ROM, like the robot control algorithm constructing program (see FIG. 8), in which it may be stored in a portable storage medium such as FD, or installed into the computer 100 via the communication network (not shown) from another device, or prestored in a hard disk (see FIG. 7) of the computer 100. The robot control program 500 may be saved or stored in any form as far as it can be finally executed on the computer.

The robot control program 500 as shown in FIG. 40 is composed of a control algorithm storage section 501 and a robot control section 502. The action of each section 501, 502 composing this robot control program 500 will be described below together with FIG. 41.

Figure 41:
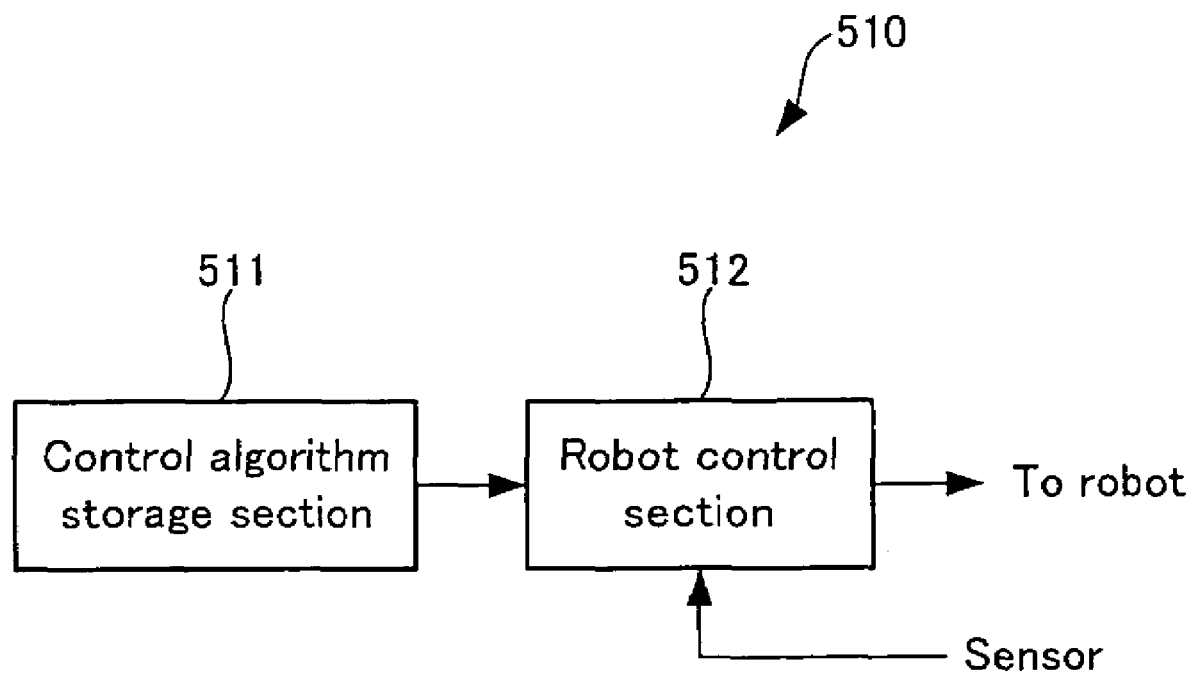
FIG. 41 is a block diagram showing one embodiment of a robot controller according to the invention.

FIG. 41 is a block diagram showing one embodiment of the robot controller according to the invention.

This robot controller 510 is implemented within the computer 100, using the robot control program 500 of FIG. 40 that is executed within the computer 100 as shown in FIGS. 6 and 7.

The robot controller 510 of FIG. 41 is composed of a control algorithm storage section 511 and a robot control section 512. The control algorithm storage section 511 and the robot control section 512 correspond to the control algorithm storage section 501 and the robot control section 502 of the robot control program 500 as shown in FIG. 40. Each section 511, 512 of the robot controller 510 of FIG. 41 is a composite of the hardware of the computer 100 of FIGS. 6 and 7, the operating system (OS) executed within the computer 100, and each section 501, 502 of the robot control program 500 as shown in FIG. 40, which operates on the OS. Each section 501, 502 of the robot control program 500 of FIG. 40 is composed of an application program portion among the composite. The action of each section 501, 502 composing the robot control program 500 as shown in FIG. 40 when the robot control program 500 is executed within the computer 100 of FIGS. 6 and 7 is the same as the action of each section 511, 512 composing the robot controller 510 as shown in FIG. 41. In the following, the action of each section 511, 512 of the robot controller 510 of FIG. 41 will be described, because the action of each section 501, 502 of the robot control program 500 of FIG. 40 is the same.

The robot controller 510 of FIG. 41 is the device that controls the operation of the robot having at least one joint joining two members to make the relative position or attitude of two members variable. As previously described, the robot 200 as shown in FIG. 6 is the humanoid type robot having the structure analogous to that of the human body, and has plural joints at the portions corresponding to the limb of the human body.

Herein, the control algorithm storage section 511 composing the robot controller 510 of FIG. 41 stores a control algorithm constructed by a recurrent neural network (RNN) where a loop of signal flow exists, having plural neurons to produce the output with analog lag including a zero lag based on the input, and including at least one lag neuron to produce the output with analog lag excluding the zero lag in the plural neurons. The robot control section 512 controls the robot of control object, employing a control signal generated based on the control algorithm stored in the control algorithm storage section 511.

The control algorithm stored in the control algorithm storage section 511 is constructed as previously described, with the coefficients determined. The details of the control algorithm stored in the control algorithm storage section 511 have been already described, and are not described here again.

The robot control section 512 inputs the measured values obtained by various sensors provided in the robot, and controls the motion of the robot of control object based on the control algorithm stored in the control algorithm storage section 511 and the measured values from the sensors.

Figure 42:
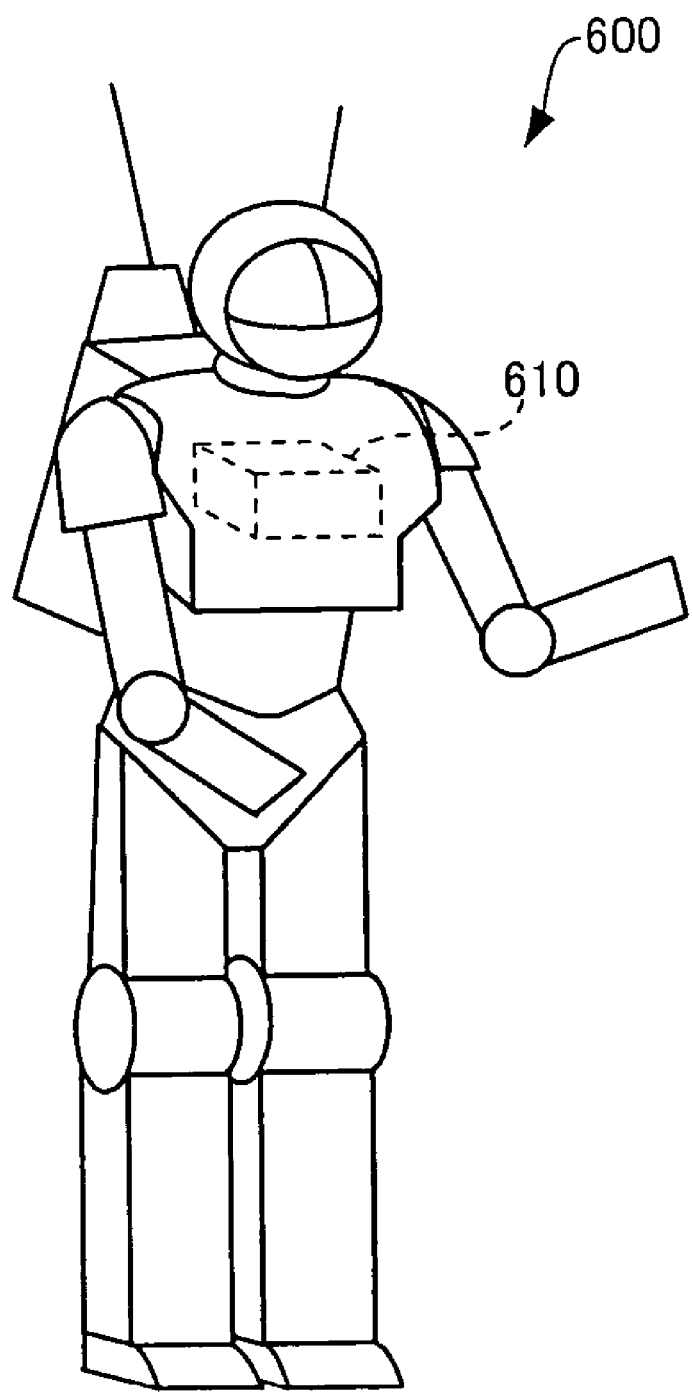
FIG. 42 is an appearance view of one embodiment of a robot according to the invention.

FIG. 42 is an appearance view of one embodiment of the robot according to the invention.

This robot 600 corresponds to the robot 200 of FIG. 6 containing the robot controller implemented with the computer 100 of FIG. 6.

That is, this robot 600 internally contains a robot controller 610 that controls the robot itself.

Figure 43:
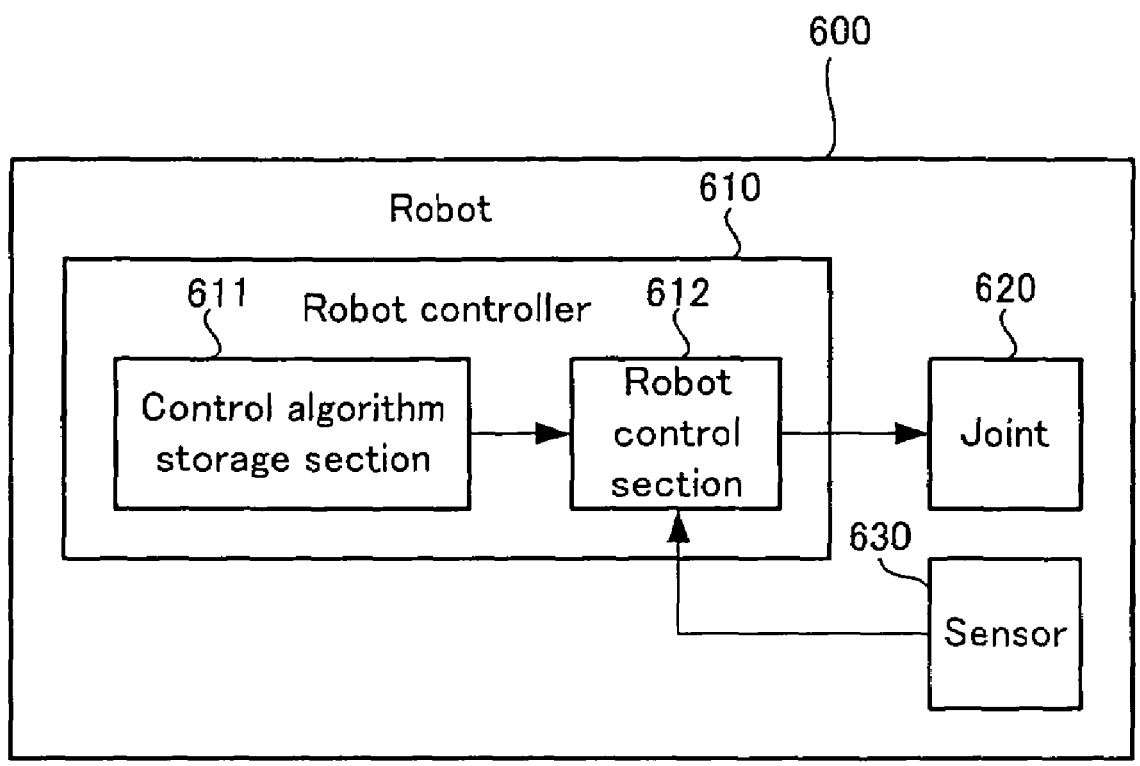
FIG. 43 is a block diagram showing the configuration of the robot 600 shown in FIG. 42.

FIG. 43 is a block diagram showing the configuration of the robot 600 as shown in FIG. 42.

This robot 600 includes the robot controller 610, a joint 620 having the motion controlled by the robot controller 610, and a sensor 630 measuring the operation of the joint.

The robot controller 610 of this robot 600 is composed of a control algorithm storage section 611 and a robot control section 612. This robot controller 610 is equivalent to the robot controller 510 as shown in FIG. 41, except that the robot controller 610 is contained in the robot 600. The control algorithm storage section 611 and the robot control section 612 composing this robot controller 610 effect the same action of the control algorithm storage section 511 and the robot control section 512 composing the robot controller 510 as shown in FIG. 41. The duplicate description is omitted.

In this way, the robot may contain the robot controller.

The invention claimed is:

1. A robot control algorithm constructing apparatus that constructs a control algorithm controlling the operation of a robot having at least one joint connecting two members to make the relative position or attitude between the two members variable, comprising:
a definition storage section that stores a definition of a neuron to produce an output with an analogue lag including a zero lag based on an input;
a control algorithm generation section that generates a control algorithm with coefficient values undetermined, constructed by a recurrent neural network having plural neurons and including at least one lag neuron to produce an output with an analogue lag excluding a zero lag in the plural neurons, in which there is a loop of signal flow, employing the definition stored in the definition storage section; and
a coefficient value determination section that determines a coefficient value for the control algorithm generated by the control algorithm generation section.

2. The robot control algorithm constructing apparatus according to claim 1, wherein the definition storage section stores a definition of neuron in which the output $V_1$ is basically produced in accordance with an expression $$\varepsilon_1 \frac{dV_1}{dt} + V_1 = V_0$$

where the input is $V_0$, the output is $V_1$ and the lag is $\varepsilon_1$.

3. The robot control algorithm constructing apparatus according to claim 1, wherein the definitions stored in the definition storage section include a definition of neuron of accepting plural inputs and producing an output with an analogue lag including a zero lag, based on a sum of the plural inputs, and the control algorithm generation section freely generates a control algorithm including the neuron in accordance with the definition.

4. The robot control algorithm constructing apparatus according to claim 1, wherein the definitions stored in the definition storage section include a definition of neuron of weighting the input and producing an output with an analogue lag including a zero lag, based on the weighted input, and the control algorithm generation section freely generates a control algorithm including the neuron in accordance with the definition.

5. The robot control algorithm constructing apparatus according to claim 1, wherein the definitions stored in the definition storage section include a definition of changing the weight in accordance with the output of another neuron, and the control algorithm generation section freely generates a control algorithm including the neuron weighting the input and another neuron changing the weight.

6. The robot control algorithm constructing apparatus according to claim 1, wherein the definitions stored in the definition storage section include a definition of changing a lag of the neuron in accordance with the output of another neuron, and the control algorithm generation section freely generates a control algorithm including the another neuron and the neuron producing the output with the lag that is changed in accordance with the output of the another neuron.

7. The robot control algorithm constructing apparatus according to claim 1, wherein the definitions stored in the definition storage section include a definition of neuron adopting a threshold instead of the input when the input exceeds the threshold, and the control algorithm generation section freely generates a control algorithm including the neuron in accordance with the definition.

8. The robot control algorithm constructing apparatus according to claim 1, wherein the definitions stored in the definition storage section include a definition of a switch turning on or off the connection between two neurons in accordance with the output of another neuron, and the control algorithm generation section freely generates a control algorithm including the another neuron and the two neurons defining the connection being turned on or off by the switch in accordance with the output of the another neuron.

9. The robot control algorithm constructing apparatus according to claim 1, wherein the control algorithm generation section freely generates a control algorithm including a partial network implementing a periodic function to output a periodic signal.

10. The robot control algorithm constructing apparatus according to claim 9, wherein the periodic function is a combination of plural unit periodic functions having mutually different periods, and the control algorithm generation section generates a partial network that is a combination of plural unit networks implementing the plural unit periodic functions and outputting plural unit periodic signals having mutually different periods in generating the partial network.

11. The robot control algorithm constructing apparatus according to claim 10, wherein the coefficient value determination section determines the coefficient values of the partial network by determining the coefficient value of each unit network in succession from a unit network outputting a unit periodic signal having longer period to a unit network outputting a unit periodic signal having shorter period among plural unit networks making up the partial network, when the partial network that is the combination of the plural unit networks is generated by the control algorithm generation section.

12. The robot control algorithm constructing apparatus according to claim 1, wherein the control algorithm generation section freely generates a control algorithm including a partial network implementing an aperiodic function represented in a polynomial and outputting an aperiodic signal.

13. The robot control algorithm constructing apparatus according to claim 12, wherein the control algorithm generation section generates a partial network that is a combination of plural unit networks implementing each term of the polynomial and outputting each unit signal corresponding to the each term in generating the partial network.

14. The robot control algorithm constructing apparatus according to claim 13, wherein the coefficient value determination section determines the coefficient values of the partial network by determining the coefficient value of each unit network in succession from a unit network outputting a unit signal corresponding to lower degree term to a unit network outputting a unit signal corresponding to higher degree term among plural unit networks making up the partial network, when the partial network that is the combination of the plural unit networks is generated by the control algorithm generation section.

15. A robot control algorithm constructing program that is executed in an information processing apparatus performing a program and enables the information processing apparatus to operate as a robot control algorithm constructing apparatus that constructs a control algorithm controlling the operation of a robot having at least one joint connecting two members to make the relative position or attitude between the two members variable, the robot control algorithm constructing program causing the information processing apparatus to operate as the robot control algorithm constructing apparatus comprising:

a definition storage section that stores a definition of a neuron to produce an output with an analogue lag including a zero lag based on an input;

a control algorithm generation section that generates a control algorithm with coefficient values undetermined, constructed by a recurrent neural network having plural neurons and including at least one lag neuron to produce an output with an analogue lag excluding a zero lag in the plural neurons in accordance with an operation, in which there is a loop of signal flow, employing the definition stored in the definition storage section; and a coefficient value determination section that determines a coefficient value for the control algorithm generated by the control algorithm generation section.

16. A robot controller that controls the operation of a robot having at least one joint connecting two members to make the relative position or attitude between the two members variable, comprising:

a control algorithm storage section that generates a control algorithm constructed by a recurrent neural network having plural neurons to produce an output with an analogue lag including a zero lag based on an input and including at least one lag neuron to produce an output with an analogue lag excluding a zero lag in the plural neurons, in which there is a loop of signal flow; and a robot control section that controls the robot of control object employing a control signal generated based on the control algorithm stored in the control algorithm storage section.

17. A robot control program that is executed in an information processing apparatus performing a program and enables the information processing apparatus to operate as a robot controller that controls the operation of a robot having at least one joint connecting two members to make the relative position or attitude between the two members variable, the robot control program causing the information processing apparatus to operate as the robot controller comprising:

a control algorithm storage section that generates a control algorithm constructed by a recurrent neural network having plural neurons to produce an output with an analogue lag including a zero lag based on an input and including at least one lag neuron to produce an output with an analogue lag excluding a zero lag in the plural neurons, in which there is a loop of signal flow; and a robot control section that controls the robot of control object employing a control signal generated based on the control algorithm stored in the control algorithm storage section.

18. A robot having at least one joint connecting two members to make the relative position or attitude between the two members variable, in which the robot has a robot controller that controls the operation of the robot, the robot controller comprising:

a control algorithm storage section that stores a control algorithm constructed by a recurrent neural network having plural neurons to produce an output with an analogue lag including a zero lag based on an input and including at least one lag neuron to produce an output with an analogue lag excluding a zero lag in the plural neurons, in which there is a loop of signal flow; and a robot control section that controls the operation of the robot employing a control signal generated based on the control algorithm stored in the control algorithm storage section.

* * * * *